United States Patent
Yonebayashi et al.

(10) Patent No.: US 12,554,170 B2
(45) Date of Patent: Feb. 17, 2026

(54) LIQUID CRYSTAL PANEL, ACTIVE RETARDER FOR 3D IMAGE DISPLAY, AND DISPLAY DEVICE

(71) Applicant: Sharp Display Technology Corporation, Kameyama (JP)

(72) Inventors: Ryo Yonebayashi, Kameyama (JP); Kohhei Tanaka, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/524,820

(22) Filed: Nov. 30, 2023

(65) Prior Publication Data
US 2024/0210777 A1    Jun. 27, 2024

(30) Foreign Application Priority Data
Dec. 23, 2022 (JP) ................ 2022-206834

(51) Int. Cl.
G02F 1/139 (2006.01)
G02B 30/25 (2020.01)
G02F 1/1335 (2006.01)
G02F 1/1343 (2006.01)
G02F 1/1345 (2006.01)

(52) U.S. Cl.
CPC .......... *G02F 1/1393* (2013.01); *G02B 30/25* (2020.01); *G02F 1/133512* (2013.01); *G02F 1/134363* (2013.01); *G02F 1/1345* (2013.01)

(58) Field of Classification Search
CPC ........ G02B 30/22; G02B 30/25; G02B 30/26; G02F 1/1354; G02F 1/134363
See application file for complete search history.

(56) References Cited

U.S. PATENT DOCUMENTS

| | | | | |
|---|---|---|---|---|
| 2002/0003597 A1* | 1/2002 | Shin | .................. | G02F 1/134363 349/110 |
| 2002/0180659 A1* | 12/2002 | Takahashi | .............. | G02B 30/24 345/4 |
| 2005/0036087 A1* | 2/2005 | Mai | ................... | G02F 1/133512 349/110 |
| 2013/0293791 A1* | 11/2013 | Abe | .................. | G02F 1/136286 349/12 |
| 2014/0111712 A1* | 4/2014 | Wu | ........................ | H04N 13/31 349/15 |

FOREIGN PATENT DOCUMENTS

JP    2020-095106 A     6/2020
KR    20070107199 A *    5/2006    ....... G02F 1/133514

* cited by examiner

*Primary Examiner* — Jessica M Merlin
(74) *Attorney, Agent, or Firm* — ScienBiziP, P.C.

(57) ABSTRACT

Provided are a liquid crystal panel capable of sufficiently reducing noise without an increase in load on the system, and an active retarder for 3D image display and a display device each including the liquid crystal panel. The liquid crystal panel includes: pixels adjacent to one another; a pair of substrates; pixel electrodes corresponding to the respective pixels; common electrodes overlapping the respective pixel electrodes; a liquid crystal layer; and an input unit. The pixel electrodes, the common electrodes, and the liquid crystal layer are disposed between the pair of substrates. The common electrodes are adjacent to one another across an aperture in a plan view. The aperture overlaps a boundary between the pixel electrodes. The input unit is configured to input a same signal to the common electrodes.

14 Claims, 15 Drawing Sheets

LIQUID CRYSTAL PANEL, ACTIVE RETARDER FOR 3D IMAGE DISPLAY, AND DISPLAY DEVICE

CROSS-REFERENCE TO RELATED APPLICATIONS

The present application claims priority under 35 U.S.C. § 119 to Japanese Patent Application No. 2022-206834 filed on Dec. 23, 2022, the contents of which are incorporated herein by reference in their entirety.

BACKGROUND OF THE INVENTION

Field of the Invention

The following disclosure relates to liquid crystal panels, active retarders for 3D image display, and display devices.

Description of Related Art

Display devices including a liquid crystal panel have widely been used in televisions, mobile phones, displays for PCs, and other various devices. Such a display device typically includes a pair of electrodes and a liquid crystal layer between a pair of substrates, and controls the amount of light transmitted through its liquid crystal panel by emitting light from the backlight and applying voltage to the liquid crystal layer to change the alignment of liquid crystal molecules.

Display devices are usually required to exhibit high display quality. JP 2020-95106 A suggests a technique of preventing deterioration of the display quality with a devised electrode structure even when the polarities of the driving voltage are inverted. Specifically, a display device including a first common electrode and a second common electrode adjacent to each other with a slit formed in between, a pixel electrode overlapping the first common electrode, and a pixel electrode overlapping the second common electrode, for example, is driven by polarity inversion driving in which common electrodes in every other column are driven with inverted polarity.

Development of various image processing technologies in recent years has been accompanied by development of technologies that realize three-dimensional stereoscopic images (called 3D images). 3D image technologies are expected to be applied to a great variety of fields such as information communication, broadcasting, medical care, education, training, military, games, animation, virtual reality, CAD, and industrial technology.

Display devices for 3D images include those based on a system using glasses and those based on a system not using glasses. Examples of the system using glasses include a shutter system that displays, while rapidly switching, images intended for the right eye and images intended for the left eye, and alternately blocking the left eye and the right eye in synchronization with the switching; and a polarizing glasses system that changes the polarization state of light between images intended for the right eye and images intended for the left eye. An example of the polarizing glasses system that has recently been attracting attention is a system that time-divisionally switches the polarization state of light between images intended for the right eye and images intended for the left eye.

BRIEF SUMMARY OF THE INVENTION

FIG. 22 is a schematic view of a mechanism in which an active retarder-type display device 1000R for 3D images enables observation of images. The display device 1000R includes, from the viewing surface side (i.e., polarizing glasses 4 side), an active retarder 1R, an image display panel 2R, and a backlight 3 (not shown). The image display panel 2R sequentially displays images intended for the right eye and images intended for the left eye by time-based switching, and the active retarder 1R controls the polarization state for each image. The viewer uses polarizing glasses 4 to see images from the active retarder 1R. The polarizing glasses 4 are designed to transmit polarized light for images intended for the right eye R(G) through the right eye part and transmitting polarized light for images intended for the left eye L(G) through the left eye part, so that the viewer sees a 3D image.

FIG. 23 is a schematic plan view of a liquid crystal panel 10R for the active retarder 1R (hereinafter referred to as the liquid crystal panel 10R of the comparative embodiment) as seen from the viewing surface side. FIG. 24 is a schematic cross-sectional view (A-A' line cross-sectional view) taken along the A-A' line in FIG. 23. FIG. 25 shows noise propagation and waveforms of liquid crystal application voltages in FIG. 24. FIG. 25 shows simplified waveforms of the voltages. In each of FIG. 24 and FIG. 25, the top of the figure corresponds to the viewing surface side and the bottom of the figure corresponds to the back surface side.

The liquid crystal panel 10R of the comparative embodiment includes, between a pair of substrates 121 and 122, pixel electrodes 111 and 112 respectively corresponding to pixels 11 and 12, a common electrode 130R overlapping the pixel electrodes, and a liquid crystal layer 140 (see FIG. 24). The common electrode 130R is typically a solid electrode, i.e., a planar electrode disposed entirely on a surface of the substrate 121 (see FIG. 23 and FIG. 24). Examinations made by the present inventors revealed that in such a liquid crystal panel 10R, since the electrode 130R are common to the pixel electrodes 111 and 112, noise from writing of a signal to one of the pixels (i.e., charging of the pixel) propagates to the adjacent pixel. In other words, the examinations demonstrated that when a pixel is charged, noise therefrom propagates to an adjacent pixel that should be at a fixed electric potential (see the arrow "a" in FIG. 25). Noise propagation affects the display quality, which is therefore an issue of the liquid crystal panel 10R of the comparative embodiment to be addressed.

Typically, an active retarder has pixels each having a size that is about a fraction of a display region and that depends on the number of divided pixels. There is a significantly large capacitance between each pixel electrode and the common electrode. When a pixel is charged, the electric potential of the common electrode is also significantly varied due to the large capacitance between the corresponding pixel electrode and the common electrode. This variation unintentionally shifts the liquid crystal application voltage (voltage to be applied to the liquid crystal layer) at an adjacent pixel from the desired voltage. This is presumably the cause of the noise propagation to the adjacent pixel.

JP 2020-95106 A nowhere mentions the technical issue relating to noise. In addition, the display device disclosed in JP 2020-95106 A has a configuration in which different signals are input to adjacent common electrodes. This configuration presumably has a large load on the system.

In response to the above issues, an object of the present invention is to provide a liquid crystal panel capable of sufficiently reducing noise without an increase in load on the system, and an active retarder for 3D image display and a display device each including the liquid crystal panel.

(1) One embodiment of the present invention is directed to a liquid crystal panel including: pixels adjacent to one another; a pair of substrates; pixel electrodes corresponding to the respective pixels; common electrodes overlapping the respective pixel electrodes; a liquid crystal layer; and an input unit, the pixel electrodes, the common electrodes, and the liquid crystal layer being disposed between the pair of substrates, the common electrodes being adjacent to one another across an aperture in a plan view, the aperture overlapping a boundary between the pixel electrodes, the input unit being configured to input a same signal to the common electrodes.

(2) In an embodiment of the present invention, the liquid crystal panel includes the structure (1), and the common electrodes are connected to one another outside a display region of the liquid crystal panel.

(3) In an embodiment of the present invention, the liquid crystal panel includes the structure (1) or (2), and the common electrodes are connected to one another inside a frame region of the liquid crystal panel.

(4) In an embodiment of the present invention, the liquid crystal panel includes the structure (1) or (2), and further includes a flexible printed circuit, wherein the common electrodes are connected to one another inside the flexible printed circuit.

(5) In an embodiment of the present invention, the liquid crystal panel includes the structure (1) or (2), and further includes a flexible printed circuit and a drive circuit, wherein the common electrodes are connected to one another inside the drive circuit.

(6) In an embodiment of the present invention, the liquid crystal panel includes the structure (1), (2), (3), (4), or (5), and further includes a light-blocking component between the pair of substrates, wherein the light-blocking component overlaps the common electrodes and the aperture in a plan view, and the input unit is configured to input a same signal to the common electrodes and the light-blocking component.

(7) In an embodiment of the present invention, the liquid crystal panel includes the structure (1), (2), (3), (4), (5), or (6), and further includes auxiliary electrodes between the pair of substrates, wherein the auxiliary electrodes are adjacent to each other across a second aperture in a plan view, and the second aperture overlaps a boundary between the pixel electrodes.

(8) In an embodiment of the present invention, the liquid crystal panel includes the structure (1), (2), (3), (4), (5), (6), or (7), and one of the substrates includes the pixel electrodes and the other of the substrates includes the common electrodes.

(9) Another embodiment of the present invention is directed to an active retarder for 3D image display, including: the liquid crystal panel including the structure (1), (2), (3), (4), (5), (6), (7), or (8).

(10) Yet another aspect of the present invention is directed to a display device including: an image display panel; and the active retarder for 3D image display including the structure (9) wherein the image display panel is configured to sequentially display an image intended for the right eye and an image intended for the left eye by time-based switching.

(11) Yet another aspect of the present invention is directed to a display device including: the liquid crystal panel including the structure (1), (2), (3), (4), (5), (6), (7), or (8).

The present invention can provide a liquid crystal panel capable of sufficiently reducing noise without an increase in load on the system; and an active retarder for 3D image display and a display device each including the liquid crystal panel.

BRIEF DESCRIPTION OF THE DRAWINGS

FIG. 10 is a schematic cross-sectional view of an active retarder of Embodiment 1 and the like.

FIG. 11 is a schematic cross-sectional view of a display device of Embodiment 1 and the like.

DETAILED DESCRIPTION OF THE INVENTION

Definition of Terms

Figure 1:
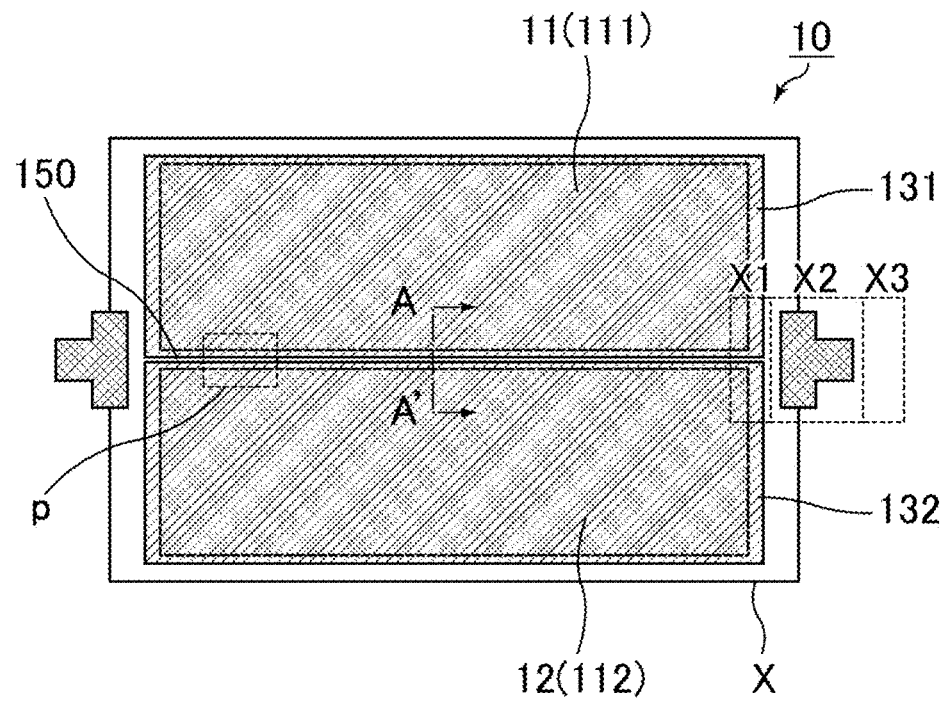
FIG. 1 is a schematic plan view of a liquid crystal panel of Embodiment 1 and the like as seen from the viewing surface side.

The "viewing surface side" herein means the side closer to the screen (display surface) of a display device or a liquid crystal panel. The "back surface side" herein means the side farther from the screen (display surface) of the display device or the liquid crystal panel.

A phase difference plate means one that introduces an in-plane phase difference Ro (absolute value |Ro|) or a thickness direction phase difference Rth (absolute value |Rth|) of 10 nm or more, preferably 20 nm or more.

The in-plane phase difference Ro is defined by the equation: $Ro=(ns-nf)d$.

The thickness direction phase difference Rth is defined by the equation: $Rth=\{nz-(nx+ny)/2\}d$.

ns represents nx or ny, whichever is larger, while nf represents nx or ny, whichever is smaller.

nx represents the principle refractive index in the slow axis direction in the plane of the phase difference plate.

ny represents the principle refractive index in the fast axis direction in the plane of the phase difference plate.

nz represents the principle refractive index in an out-of-plane direction, i.e., a direction vertical to a surface of the phase difference plate.

d represents the thickness of the phase difference plate.

The measurement wavelength for a principle refractive index, a phase difference, or other optical parameters is 550 nm, unless otherwise specified.

Hereinafter, embodiments of the present invention are described. The present invention is not limited to the contents of the following embodiments. The design may be modified as appropriate within the range satisfying the configuration of the present invention.

For convenience, the following description and drawings are based on a mode in which one pixel unit in a liquid crystal panel is divided into two pixels (subpixels). Yet, it should be understood that the liquid crystal panel of the present invention is not limited to the above mode and may be in any mode in which one pixel unit is divided into multiple (i.e., two or more) pixels. In particular, the most preferred mode is one in which one pixel unit has three or four pixels. Liquid crystal panels in these modes can specifically be described as the following liquid crystal panels (i) and (ii).

(i) A liquid crystal panel including: three pixels in one pixel unit; a pair of substrates; pixel electrodes (i.e., a first pixel electrode, a second pixel electrode, and a third pixel electrode) corresponding to the respective pixels; common electrodes (i.e., a first common electrode, a second common electrode, and a third common electrode) overlapping the respective pixel electrodes; a liquid crystal layer; and an input unit, the pixel electrodes, the common electrodes, and the liquid crystal layer being disposed between the pair of substrates, the first common electrode, the second common electrode, and the third common electrode being adjacent to one another across an aperture in a plan view, the apertures (i.e., an aperture between the first common electrode and the second common electrode, an aperture between the second common electrode and the third common electrode, and an aperture between the third common electrode and the first common electrode) respectively overlapping a boundary between the first pixel electrode and the second pixel electrode, a boundary between the second pixel electrode and the third pixel electrode, and a boundary between the third pixel electrode and the first pixel electrode, the input unit being configured to input the same signal to the first common electrode, the second common electrode, and the third common electrode.

(ii) A liquid crystal panel including: four pixels in one pixel unit; a pair of substrates; pixel electrodes (i.e., a first pixel electrode, a second pixel electrode, a third pixel electrode, and a fourth pixel electrode) corresponding to the respective pixels; common electrodes (i.e., a first common electrode, a second common electrode, a third common electrode, and a fourth common electrode) overlapping the respective pixel electrodes; a liquid crystal layer; and an input unit, the pixel electrodes, the common electrodes, and the liquid crystal layer being disposed between the pair of substrates, the first common electrode, the second common electrode, the third common electrode, and the fourth common electrode being adjacent to one another across an aperture in a plan view, the apertures each overlapping a boundary between the corresponding two of the four pixel electrodes, the input unit being configured to input the same signal to the first common electrode, the second common electrode, the third common electrode, and the fourth common electrode. In this mode, for example, the aperture between the first common electrode and the second common electrode overlaps the boundary between the first pixel electrode and the second pixel electrode, and the other apertures between the common electrodes each similarly overlap a boundary between the pixel electrodes corresponding to the common electrodes.

Embodiment 1

Figure 2:
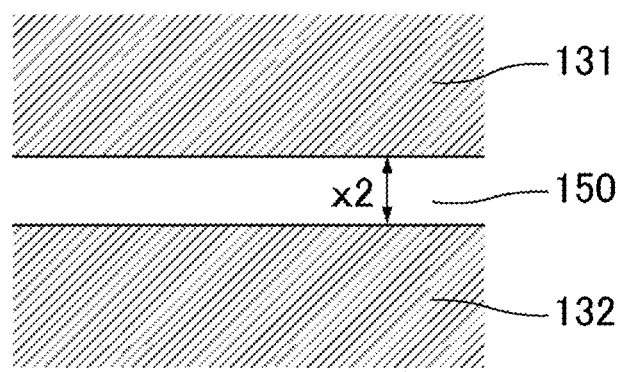
FIG. 2 is an enlarged view of the p portion in FIG. 1.
Figure 3:
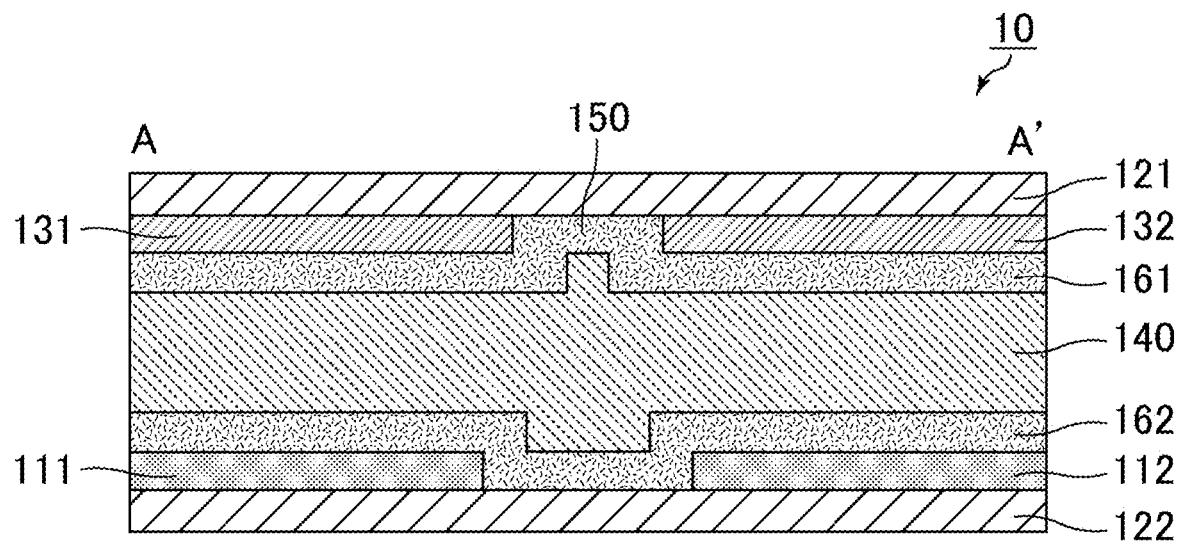
FIG. 3 is a schematic cross-sectional view taken along the A-A' line in FIG. 1 (A-A' line cross-sectional view).
Figure 4:
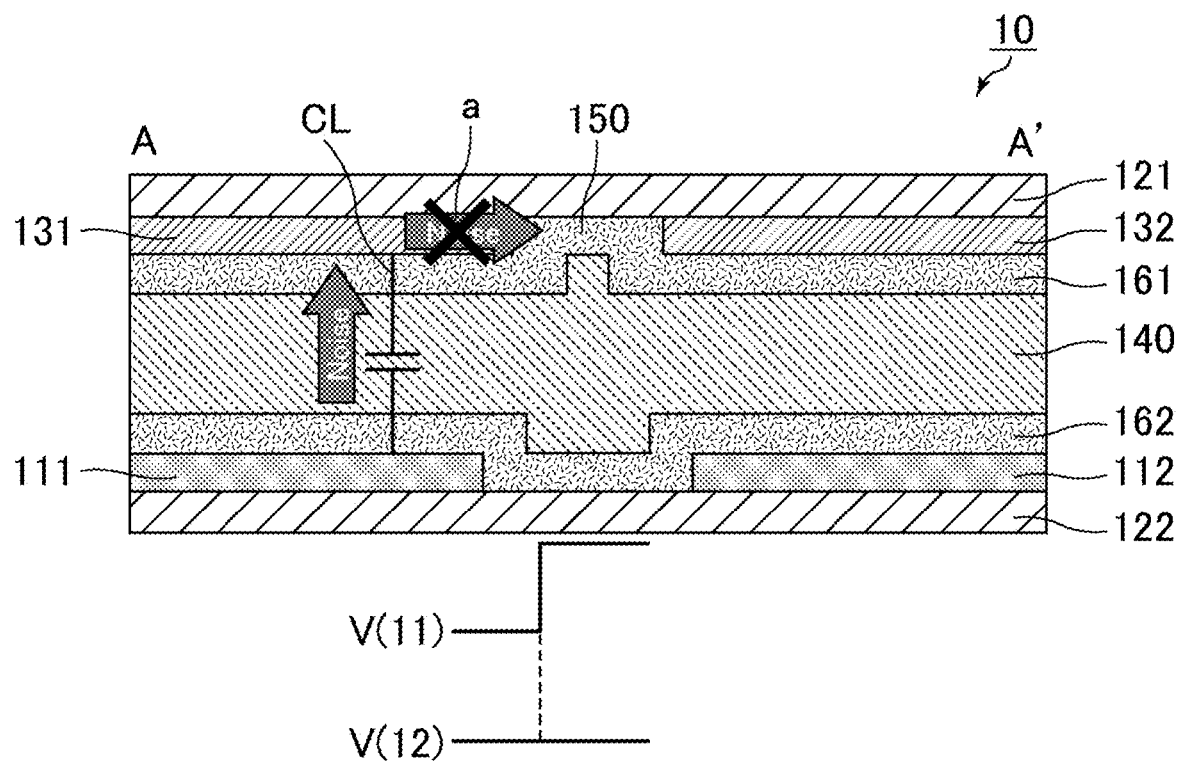
FIG. 4 shows noise propagation and waveforms of liquid crystal application voltages in Embodiment 1.

FIG. 1 is a schematic plan view of a liquid crystal panel of the present embodiment as seen from the viewing surface side. FIG. 2 is an enlarged view of the p portion in FIG. 1. FIG. 3 is a schematic cross-sectional view taken along the A-A' line in FIG. 1 (A-A' line cross-sectional view). FIG. 4 shows noise propagation and waveforms of liquid crystal application voltages in FIG. 3. FIG. 4 shows simplified waveforms of the voltages. In each of FIG. 3 and FIG. 4, the top of the figure corresponds to the viewing surface side and the bottom of the figure corresponds to the back surface side.

A liquid crystal panel 10 of the present embodiment includes pixels adjacent to one another. As described above, in the drawings, the mode is referred in which each pixel unit has a first pixel 11 and a second pixel 12 for convenience. The liquid crystal panel 10 includes, between the pair of substrates 121 and 122, a first pixel electrode 111 corresponding to the first pixel 11, a second pixel electrode 112 corresponding to the second pixel 12, a first common electrode 131 overlapping the first pixel electrode 111, a second common electrode 132 overlapping the second pixel electrode 112, and a liquid crystal layer 140. Alignment films 161 and 162 are respectively disposed between the liquid crystal layer 140 and the common electrodes 131 and 132 and between the liquid crystal layer 140 and the pixel electrodes 111 and 112.

As described above, in the liquid crystal panel 10 of the present embodiment, the pixel electrodes 111 and 112 are disposed on one of the pair of substrates (second substrate 122) and the common electrodes 131 and 132 are disposed on the other of the pair of substrates (first substrate 121). In the present embodiment, voltage is applied between the pixel electrodes and the common electrodes to generate a vertical electric field in the liquid crystal layer, thus providing display. Examples of such a vertical electric field mode include a vertical alignment (VA) mode and a twisted nematic (TN) mode.

The pair of substrates 121 and 122 may be any substrates transparent to visible light. For example, glass substrates and plastic substrates are suitable. In the present embodiment, the common electrodes 131 and 132 are disposed on the first substrate 121, and the pixel electrodes 111 and 112 are disposed on the second substrate 122.

The first common electrode 131 and the second common electrode 132 are adjacent to each other across an aperture 150 in a plan view. This enables a structure in which while the common electrodes 131 and 132 are adjacent to each other across the aperture 150, the common electrodes 131 and 132 are not connected (not electrically continuous) to each other in the aperture 150 (see FIG. 3). The aperture 150 overlaps the boundary between the pixel electrodes 111 and 112 that respectively overlap the common electrodes 131 and 132 (see FIG. 3).

In the present embodiment, for example, the portion of a planar common electrode (solid common electrode) overlapping the boundary between the pixel electrodes that overlap the common electrode is removed. Thereby, the structure in which the common electrodes 131 and 132 are adjacent to each other across the aperture 150 can be obtained. In particular, when all such portions of the common electrode in the display region AA are removed, in a plan view, a structure is obtainable in which the aperture 150 extends like a continuous line extending along the entire range between the first common electrodes 131 and the second common electrodes 132 at least in the display region AA (see FIG. 1 and FIG. 2).

The size of the aperture 150 in a plan view may be any size with which the aperture 150 overlaps the boundary between the pixel electrodes, i.e., the pixel electrode-absent portion (meaning a portion without the pixel electrode). This reduces the influence on other layers such as the liquid crystal layer 140, thus resulting in a minor influence on a function as a liquid crystal panel 10. For example, the width of the aperture 150 is preferably from 0.1 to 1000 μm, more preferably from 10 to 100 μm. The "width of an aperture" means the width in a plan view between the first common electrode 131 and the second common electrode 132, between which the aperture 150 is sandwiched, and corresponds to the length x2 in FIG. 2.

An embodiment in which the above influence is further sufficiently reduced is described later as Embodiment 3.

The pixel electrodes 111 and 112 are formed from a transparent conductive material such as indium tin oxide (ITO) or indium zinc oxide (IZO). The pixel electrodes 111 and 112 are typically disposed in the respective regions each surrounded by two adjacent source lines and two adjacent gate lines, and are each electrically connected to the corresponding source line via the corresponding semiconductor layer including a thin film transistor (TFT).

The common electrodes 131 and 132 are formed from a transparent conductive material such as ITO or IZO. For example, the common electrodes 131 and 132 can be formed by patterning a transparent electrode film formed from a transparent conductive material by a known photolithography method. In the present embodiment, for example, a planar (solid) common electrode is formed and patterned as described above, and then the portion of the planar common electrode overlapping the boundary between the pixel electrodes that overlap the planar common electrode is removed. Thus, the planar common electrode can be divided into the common electrodes 131 and 132.

Figure 24:
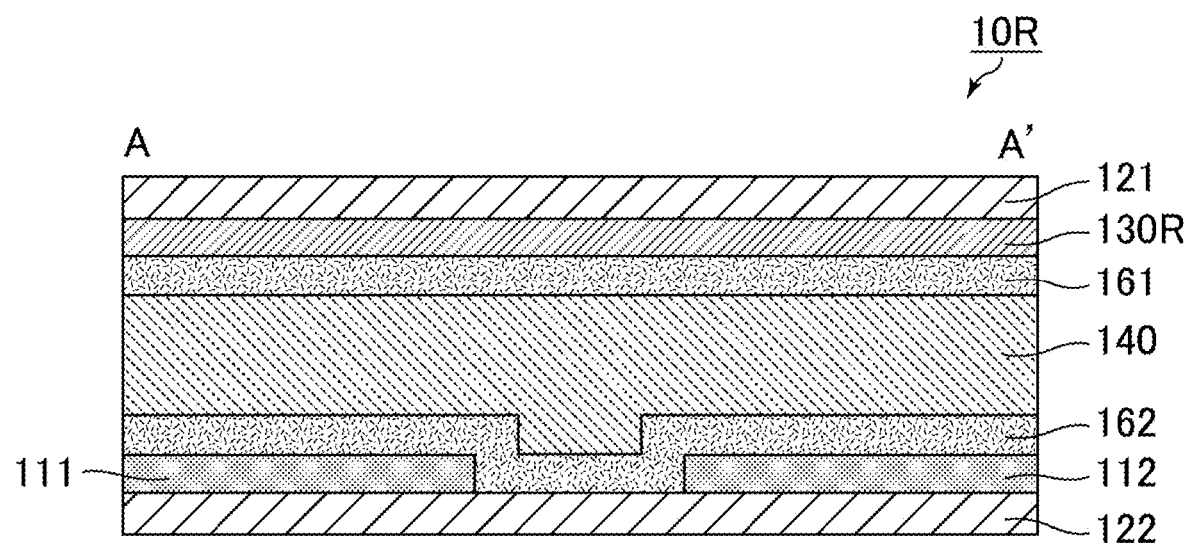
FIG. 24 is a schematic cross-sectional view taken along the A-A' line in FIG. 23 (A-A' line cross-sectional view).
Figure 25:
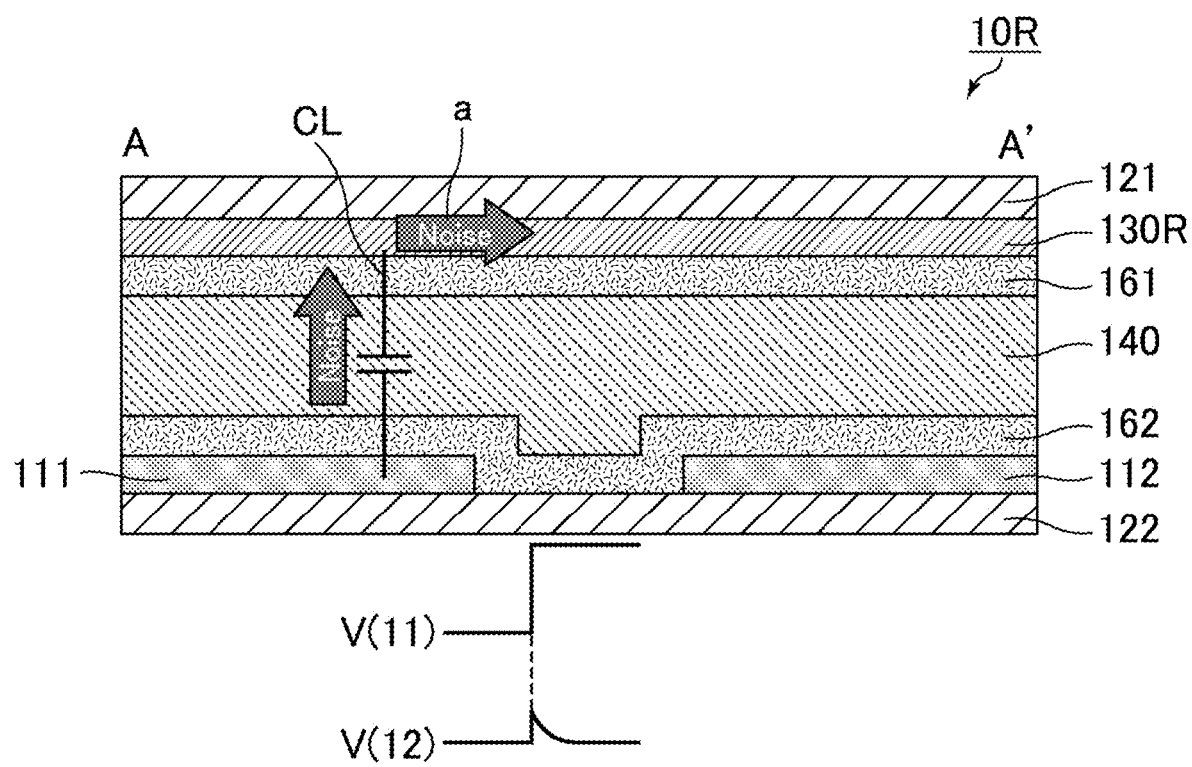
FIG. 25 is a conceptual view showing noise propagation and waveforms of liquid crystal application voltages in the comparative embodiment.

In the liquid crystal panel 10R of the comparative embodiment, as shown in FIG. 24 and FIG. 25, the solid common electrode 130R and the pixel electrodes 111 and 112 respectively corresponding to the pixels 11 and 12 are disposed across the liquid crystal layer 140 between the pair of substrates 121 and 122. In other words, as in a typical display, the common electrode 130R is disposed on the entire surface of the display region, meaning that the common electrode is not divided unlike the liquid crystal panel 10 of the present embodiment. In such a liquid crystal panel 10R, for example, charging by inputting a signal to the first pixel 11 causes supply of a common electric potential (reference electric potential) to the common electrode 130R, generating an electric potential difference between the first pixel electrode 111 corresponding to the first pixel 11 and the common electrode 130R. This electric potential difference changes the alignment state of the liquid crystal molecules in the liquid crystal layer 140, so that the predetermined grayscale display is provided by each pixel. At this time, the common electric potential is variable due to the huge amount of capacitance between the first pixel electrode 111 and the common electrode 130R. The varying common electric potential affects the common electric potential right above the second pixel electrode 112 adjacent to the first pixel electrode 111 (see the a portion in FIG. 25). As a result, there is noise on the liquid crystal application voltage (i.e., voltage applied to the liquid crystal layer 140) by the second pixel 12, which deteriorates the display quality. FIG. 25 shows at the lower portion the waveforms of the liquid crystal application voltage V(11) at the first pixel 11 and the liquid crystal application voltage V(12) at the second pixel 12 when the first pixel 11 is charged.

In contrast, the present invention reduces noise propagation to the adjacent pixel by using the aperture 150 to (I) increase the common electric potential resistance in the direction crossing the pixel boundary (the direction a in FIG. 4) or (II) remove the conductive portion in the direction above and open the circuit. In other words, since the resistance is increased in the path along which noise propagates upon charging or the path itself is lost by (I) increasing the common electric potential resistance or (II) opening the circuit, the noise propagation to the adjacent pixel is reduced and thus the display quality is improved. In particular, the present embodiment corresponds to the embodiment (II) and thus the common electrode is absent in the portion corresponding to the pixel boundary, so that the noise propagation path is almost completely lost in the display region (this state is indicated by a cross "×" in FIG. 4). The effect of reducing noise propagation to the adjacent pixel is therefore significantly high. An embodiment corresponding to the embodiment (I) in which the common electric potential resistance is increased in the noise propagation path is described later as Embodiment 2. Meanwhile, as described later, in the present invention, the common electrodes 131 and 132 are not completely divided electrodes requiring different signals, meaning that the number of required signals remains one (the same signal) from the point of view of the driving system. This does not increase the load on the system. In this manner, the present invention can sufficiently reduce noise without an increase in load on the system.

Any liquid crystal panel can achieve the effect obtained by forming the aperture 150 as long as it has a structure in which pixel electrodes, a common electrode, and a liquid crystal layer are disposed between a pair of substrates and the alignment state of the liquid crystal layer is controlled by application of voltage between the pixel electrodes and the common electrode. It is particularly useful to form the aperture 150 in, i.e., apply the concept of the present invention to, a liquid crystal panel in which each pixel electrode has a size of about a fraction of the display region AA and the electric capacitance between the pixel electrode and the common electrode is large.

The liquid crystal panel 10 includes an input unit X configured to input the same signal to the common electrodes 131 and 132. The input unit X is a unit that connects the common electrodes 131 and 132 to each other inside or outside the liquid crystal panel 10. In other words, the liquid crystal panel 10 has a structure in which the common electrodes 131 and 132 are connected to each other inside or outside the liquid crystal panel 10. This maintains the common electrodes 131 and 132 at the same electric potential. In this manner, the liquid crystal panel 10 of the present embodiment electrically divides a common electrode in the aperture 150, while keeping the divided parts of the common electrode connected to each other inside or outside the liquid crystal panel 10 without completely electrically dividing the common electrode. In particular, a structure is preferred in which the common electrodes 131 and 132 are connected to each other outside the display region of the liquid crystal panel 10.

The signal means a driving signal. In the present embodiment, when any of the pixels is charged through input of a signal, the desired electric potential is maintained between the common electrode and the pixel electrode in a pixel adjacent to the charged pixel. Input of a DC signal to the adjacent pixel from the outside may be continued, or the adjacent pixel may be in a floating state by switching off the charging path using a switching element.

Figure 5:
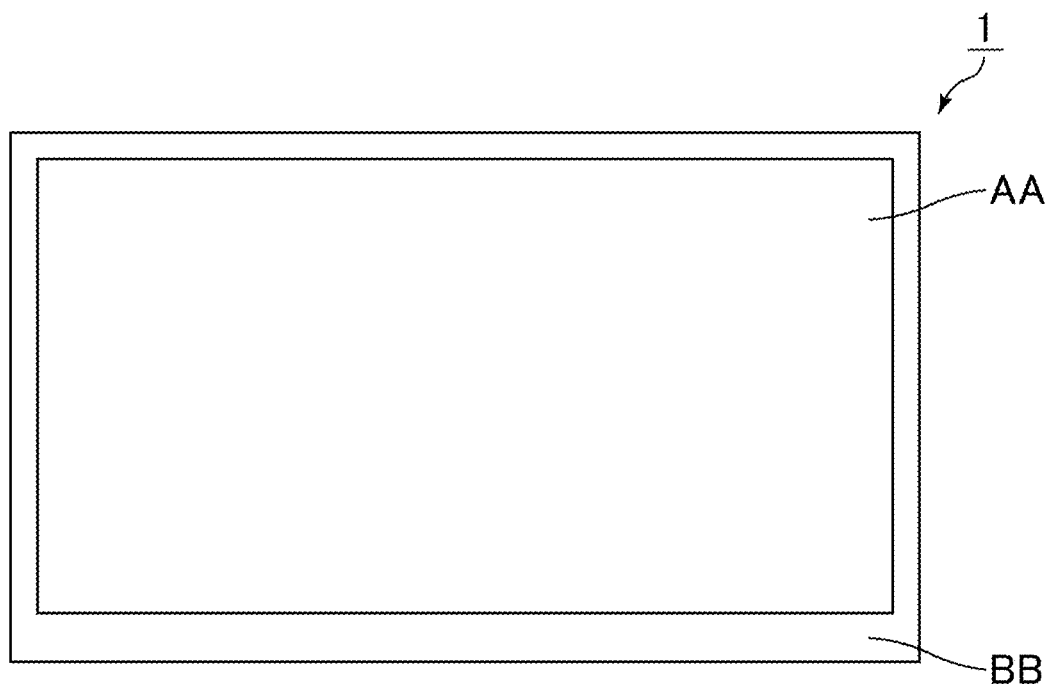
FIG. 5 is a schematic plan view of a liquid crystal panel of Embodiment 1 and the like as seen from the viewing surface side, showing the display region and the frame region.

The liquid crystal panel 10 has, as shown in FIG. 5, a display region AA and a frame region BB surrounding the outer edge of the display region AA. The display region AA is a region that displays desired images, for example. The frame region BB may not transmit light. FIG. 5 is a schematic plan view of the liquid crystal panel as seen from the viewing surface side, showing the display region and the frame region.

Figure 6:
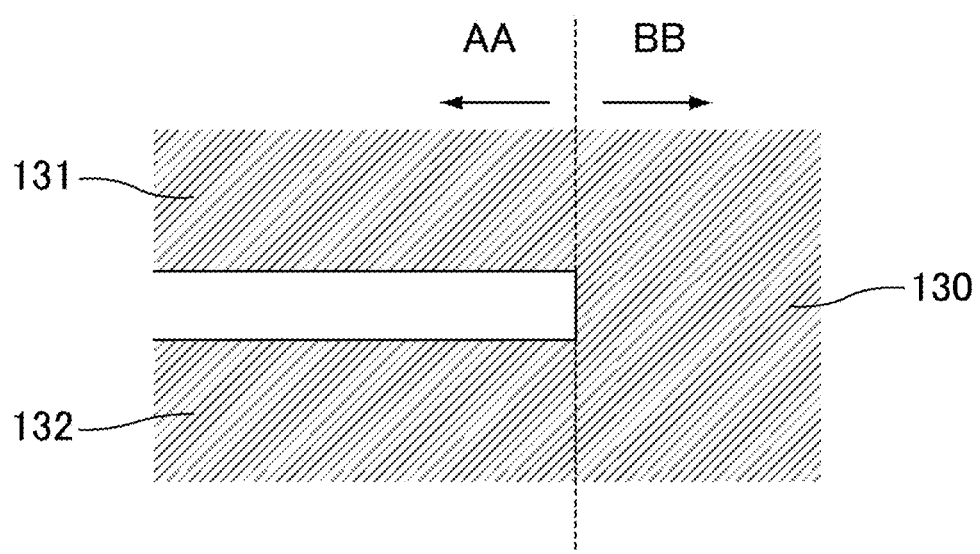
FIG. 6 is an enlarged schematic plan view of the X1 portion in FIG. 1.
Figure 7:
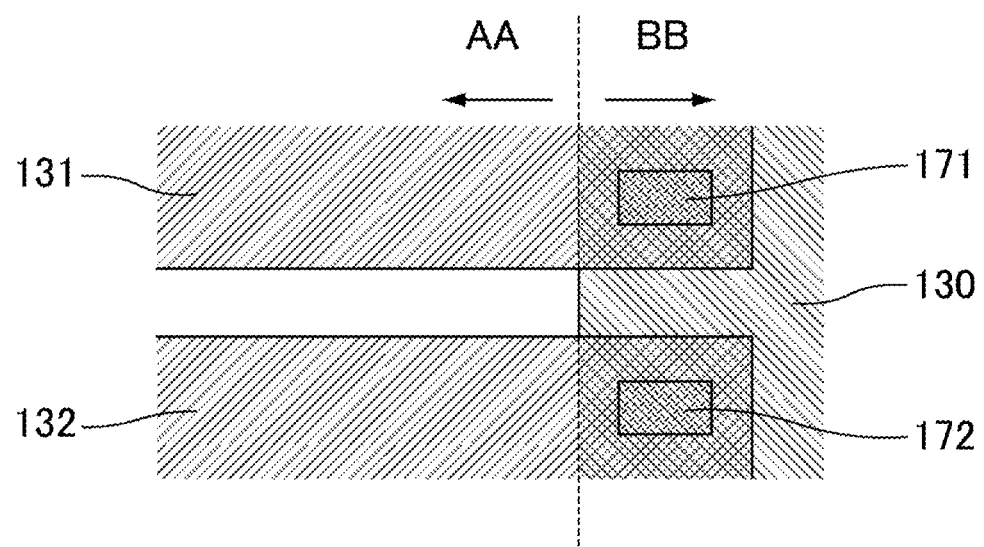
FIG. 7 is another enlarged schematic plan view of the X1 portion in FIG. 1.
Figure 8:
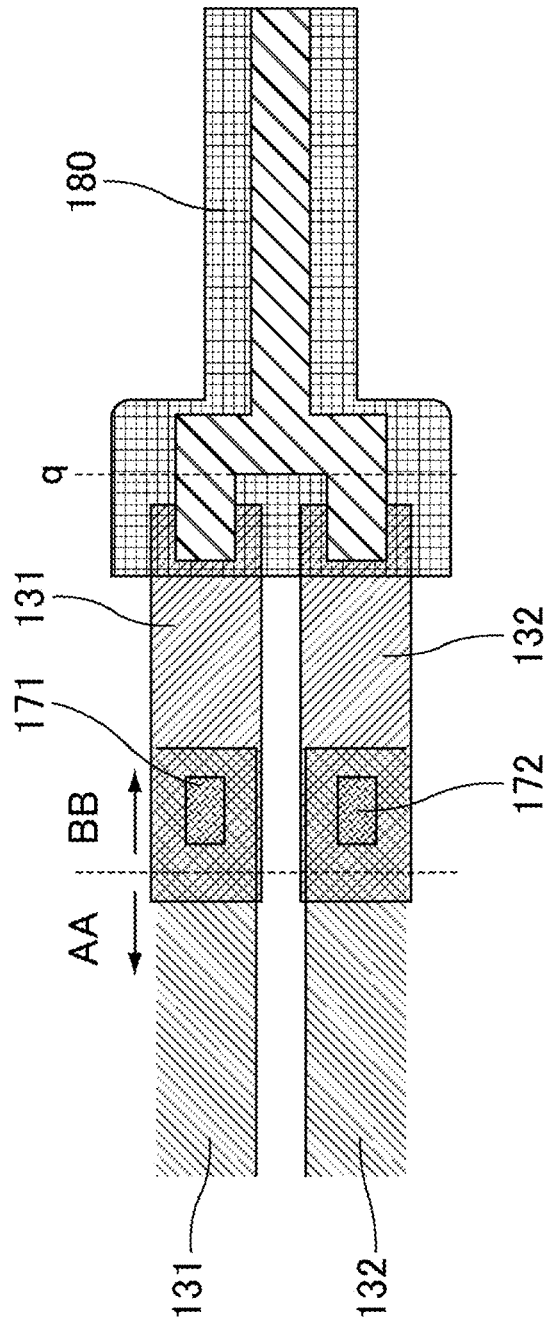
FIG. 8 is an enlarged schematic plan view of the X2 portion in FIG. 1.
Figure 9:
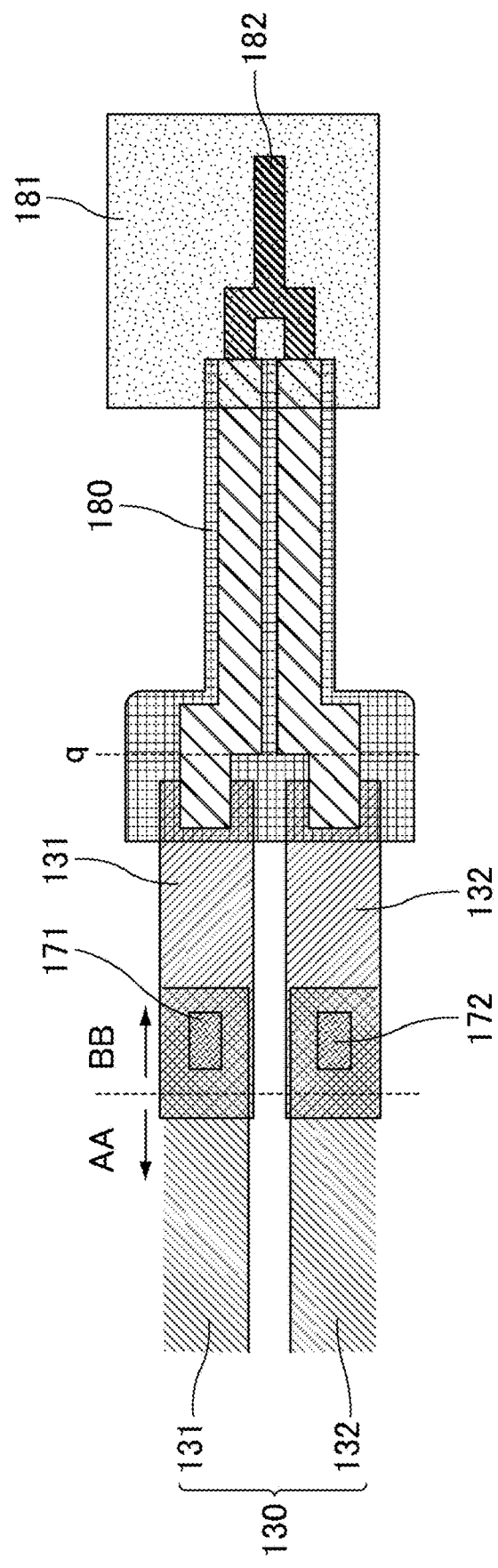
FIG. 9 is an enlarged schematic plan view of the X3 portion in FIG. 1.

FIG. 6 to FIG. 9 each conceptually show an example of a mode in which the common electrodes 131 and 132 are connected to each other outside the display region of the liquid crystal panel 10. FIG. 6 and FIG. 7 are enlarged schematic plan views of the X1 portion in FIG. 1 in a mode in which the common electrodes 131 and 132 are connected to each other inside the frame region BB of the liquid crystal panel 10. FIG. 8 is an enlarged schematic plan view of the X2 portion in FIG. 1 in a mode in which the liquid crystal panel 10 further includes a flexible printed circuit 180 and the common electrodes 131 and 132 are connected to each other inside the flexible printed circuit 180. FIG. 9 is an enlarged schematic plan view of the X3 portion in FIG. 1 in a mode in which the liquid crystal panel 10 further includes a flexible printed circuit 180 and a drive circuit 181 and the common electrodes 131 and 132 are connected to each other inside the drive circuit 181. The X1 portion corresponds to the position around the boundary between the display region AA and the frame region BB of the liquid crystal panel 10. The X2 portion corresponds to the position around the end q of the liquid crystal panel 10. The X3 portion corresponds to the position outside the liquid crystal panel 10.

FIG. 6 shows a structure in which the common electrode 130 is divided into the common electrodes 131 and 132 only inside the display region AA. This structure is obtainable by, for example, when removing the portions each overlapping a boundary between pixel electrodes from the planar common electrode (solid common electrode), removing only such portions inside the display region AA of the liquid crystal panel 10.

FIG. 7 shows a structure in which the common electrode 130 is disposed in the frame region BB, the common electrode 130 and the first common electrode 131 are connected to each other via a contact hole 171, and the common electrode 130 and the second common electrode 132 are connected to each other via a contact hole 172. In this structure, the first common electrode 131 and the second common electrode 132 are connected to each other via the common electrode 130 disposed in the frame region BB.

FIG. 8 shows a structure in which the flexible printed circuit 180 is connected to the liquid crystal panel 10 at the end q of the liquid crystal panel 10, and the first common electrode 131 and the second common electrode 132 are short-circuited by a conductive line in the flexible printed circuit 180. The first common electrode 131 in the display region AA and the first common electrode 131 in the frame region BB are connected to each other via the contact hole 171, and the second common electrode 132 in the display region AA and the second common electrode 132 in the frame region BB are connected to each other via the contact hole 172.

FIG. 9 shows a structure in which the flexible printed circuit 180 is connected to the liquid crystal panel 10 at the end q of the liquid crystal panel 10, the drive circuit 181 is further connected to the flexible printed circuit 180, and the first common electrode 131 and the second common electrode 132 are short-circuited by a conductive line 182 in the drive circuit 181. The first common electrode 131 in the display region AA and the first common electrode 131 in the frame region BB are connected to each other via the contact hole 171, and the second common electrode 132 in the display region AA and the second common electrode 132 in the frame region BB are connected to each other via the contact hole 172.

The flexible printed circuit 180 is also referred to as a signal transmission unit, and usually has a structure in which many conductive lines are formed on an insulating, flexible substrate. The drive circuit 181 is a member that processes various signals transmitted through the flexible printed circuit 180, and typically includes a large-scale integration (LSI) chip with conductive lines inside. In FIG. 8 and FIG. 9, other signals and conductive lines possibly present in the flexible printed circuit 180 or the drive circuit 181 are omitted.

Alignment films 161 and 162 that enable a function of controlling the alignment of liquid crystal molecules in the liquid crystal layer 140 are provided respectively between the liquid crystal layer 140 and the common electrodes 131 and 132 and between the liquid crystal layer 140 and the pixel electrodes 111 and 112.

The alignment films 161 and 162 and the liquid crystal layer 140 are not limited and may be those used for typical liquid crystal display devices. Thus, descriptions thereof are omitted. Other various members that may be further included in the liquid crystal panel 10 are not limited either and may be those usually used in the field of display devices.

Hereinbelow, description is made based on an example of an active retarder for 3D image display including the liquid crystal panel of the present embodiment. Herein, the active retarder for 3D image display is also simply referred to as the active retarder.

Figure 10:
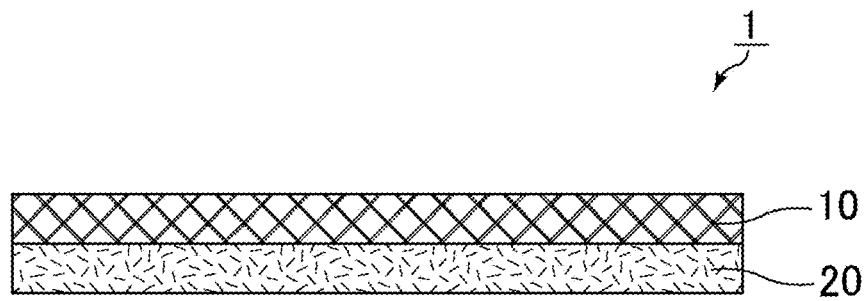

FIG. 10 is a schematic cross-sectional view of the active retarder including the liquid crystal panel of the present embodiment (also referred to as the active retarder of the present embodiment). An active retarder 1 of the present embodiment includes, as shown in FIG. 10, the liquid crystal panel 10 of the present embodiment and a phase difference plate 20.

The phase difference plate 20 may be any one that introduces an in-plane phase difference Ro or a thickness direction phase difference Rth, but is preferably a uniaxial phase difference plate that introduces an in-plane phase difference Ro. The absolute value |Ro| of the in-plane phase difference Ro is suitably 50 nm or more, more preferably 80 nm or more, still more preferably 110 nm or more, while it is preferably 500 nm or less, more preferably 400 nm or less, still more preferably 160 nm or less.

Suitable as the phase difference plate 20 are, for example, a λ/4 phase difference plate (also referred to as a λ/4 plate) and a λ/2 phase difference plate (also referred to as a λ/2 plate).

The phase difference plate 20 may have a single layer structure or a laminate structure including two or more layers. When the image display panel 2 and the active retarder 1 are assembled, the phase difference plate 20 is suitably disposed on the image display panel 2 side.

The thickness of the phase difference plate 20 is not limited and is preferably, for example, 10 nm or greater and 1 mm or smaller, more preferably 500 nm or greater and 0.5 mm or smaller.

The phase difference plate 20 may be formed from any material. For example, a stretched polymer film, a film made of a liquid crystalline material whose alignment is fixed, or a thin plate made of an inorganic material can be used. The phase difference plate 20 may be formed by any method. When the phase difference plate 20 is formed from a polymer film, for example, a method such as solvent casting or melt extrusion can be used. Also, co-extrusion may be used to form a plurality of phase difference plates 20 simultaneously. The polymer film may or may not be stretched as long as the desired phase difference is introduced. The stretching method may be any method such as tensile stretching between rolls, compression stretching between rolls, tenter transverse uniaxial stretching, oblique stretching, vertical and transverse biaxial stretching, or special stretching where a film is stretched under the shrinkage stress of a heat shrinkable film. When the phase difference plate 20 is formed from a liquid crystalline material, for example, a method can be used such as a method of applying a liquid crystalline material to a base film having undergone an alignment treatment and fixing the alignment of the material. The method may be one including no special alignment treatment on a base film or one including removing the liquid crystalline material from the base material after the alignment fixation and transferring the material to another film, as long as the desired phase difference is introduced. A method may also be used which includes no fixation of the alignment of a liquid crystalline material. When the phase difference layer is formed from a non-liquid crystalline material, the same formation method as when the phase difference layer is formed from a liquid crystalline material may be used.

The phase difference plate 20 can appropriately be a stretched film containing a material with a positive intrinsic birefringence (intrinsic anisotropy of refractive index) as its component. Examples of the material with a positive intrinsic birefringence include polycarbonate, polysulfone, polyethersulfone, polyethylene terephthalate, polyethylene, polyvinyl alcohol, norbornene, triacetyl cellulose, diacetyl cellulose, and a cycloolefin polymer.

The method of producing the active retarder 1 using the liquid crystal panel 10 and the phase difference plate 20 are not limited, and may be a method commonly used in the field of liquid crystal panels.

The active retarder 1 of the present embodiment can be used in combination with the image display panel 2 that sequentially displays images intended for the right eye and images intended for the left eye by time-based switching. The active retarder 1 can control the voltage applied to its liquid crystal layer 140 in synchronization with the time-based switching to change the polarization state of light between the images intended for the right eye and the images intended for the left eye.

During On-Off transition of the active retarder, images on the display may possibly be distorted. Thus, the active retarder of the present embodiment suitably employs a scanning backlight system that scans the light-on regions according to the On/Off control for the active retarder.

Hereinbelow, description is made based on an example of a display device including the active retarder of the present embodiment (such a display device is also referred to as the display device of the present embodiment). As described above, the liquid crystal panel of the present embodiment can sufficiently reduce noise without an increase in load on the system, and is thus very useful in various applications other than an active retarder. The display device including the liquid crystal panel of the present embodiment can therefore be suitable for use in a variety of fields.

Figure 11:
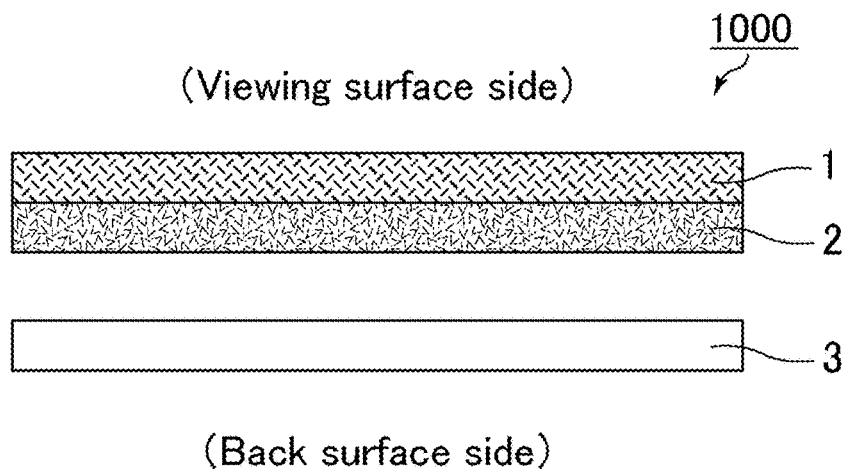
Figure 12:
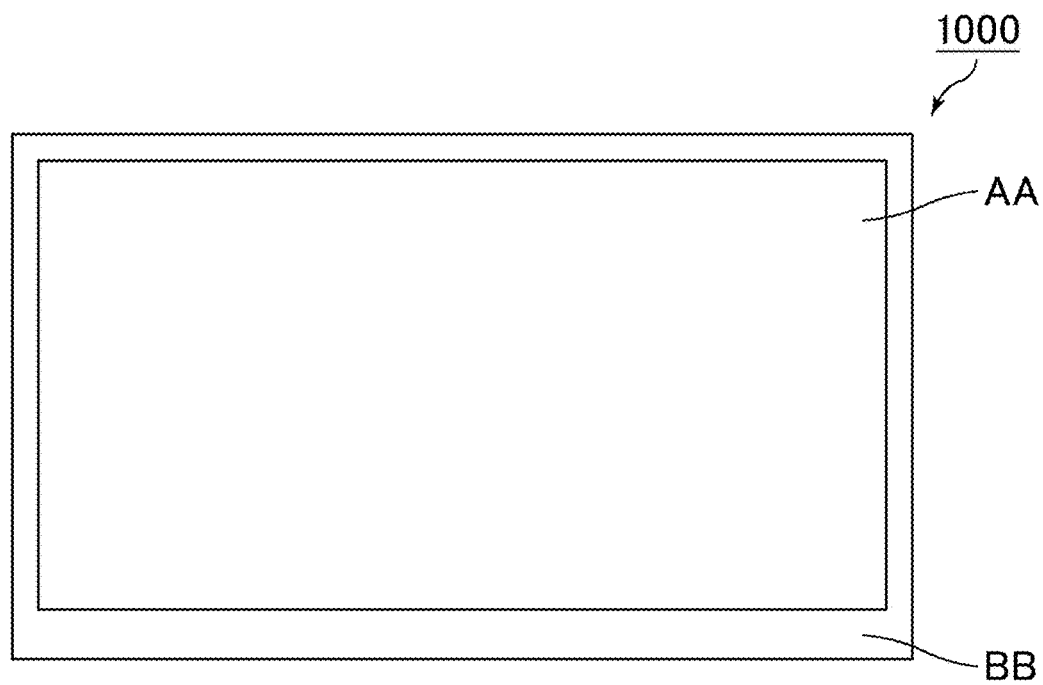
FIG. 12 is a schematic plan view of the display device of Embodiment 1 and the like as seen from the viewing surface side.
Figure 13:
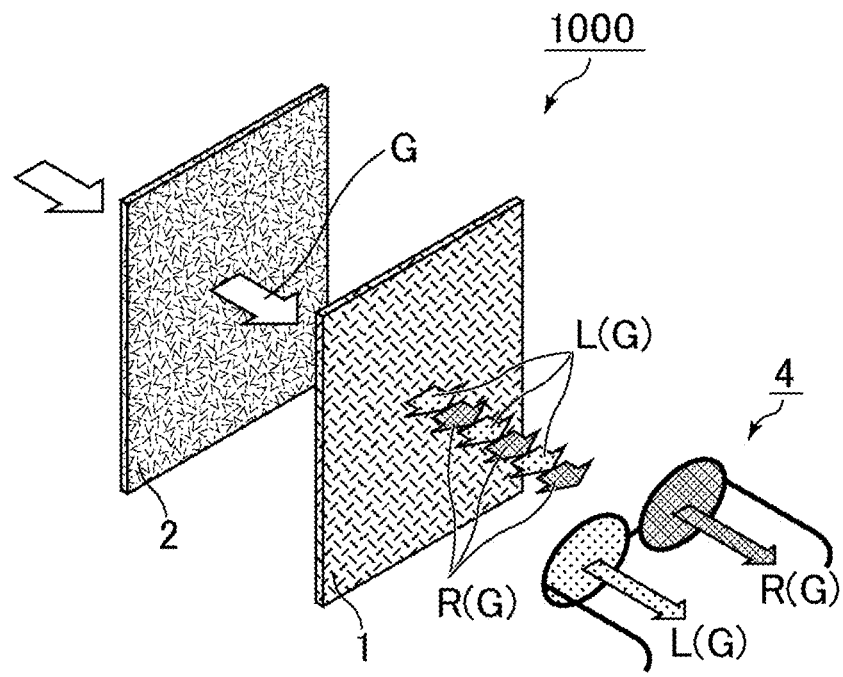
FIG. 13 is a schematic view showing a mechanism in which the display device of Embodiment 1 and the like enables observation of images.

FIG. 11 is a schematic cross-sectional view of the display device of the present embodiment. FIG. 12 is a schematic plan view of the display device of the present embodiment as seen from the viewing surface side. FIG. 13 is a schematic view showing a mechanism in which the display device of the present embodiment enables observation of images.

As shown in FIG. 11 and FIG. 13, a display device 1000 of the present embodiment includes the active retarder 1 of the present embodiment described above and the image display panel 2. The display device 1000 further includes a backlight 3 (not shown in FIG. 13) on or behind the back surface side of the image display panel 2. The display device 1000 has, as shown in FIG. 12, the display region AA and the frame region BB surrounding the outer edge of the display region AA. The display region AA is a region that displays desired images, for example. In other words, it is the region viewable from the viewing surface side of the display device 1000 when the light source is turned on. The frame region BB is a frame-shaped region surrounding the outer edge of the display region AA. The frame region BB may not transmit light.

The image display panel 2 sequentially displays images intended for the right eye and images intended for the left eye by time-based switching. As described above, the active retarder 1 changes the polarization state of light between the images intended for the right eye R(G) and the images intended for the left eye L(G) in synchronization with the time-based switching (see FIG. 13). The viewer sees the images through polarizing glasses 4 from the active retarder 1 side (see FIG. 13).

The image display panel 2 is suitably a liquid crystal display panel using liquid crystals or a self-luminous display panel.

The liquid crystal display panel may have any structure in which a liquid crystal layer is sandwiched between a pair of substrates. The liquid crystal display panel may be a liquid crystal display panel in which a liquid crystal layer is sandwiched between a pair of substrates with pixel electrodes and a common electrode formed on one of the substrates, and voltage is applied between the pixel electrodes and the common electrode to generate a transverse electric field (including a fringe electric field) in the liquid crystal layer. The liquid crystal display panel may also be a liquid crystal display panel in which a liquid crystal layer is sandwiched between a pair of substrates with pixel electrodes formed on one of the substrates and a common electrode on the other of the substrates, and voltage is applied between the pixel electrodes and the common electrode to generate a vertical electric field in the liquid crystal layer. Specifically, examples of the transverse electric field mode include the fringe field switching (FFS) mode and the in-plane switching (IPS) mode. Examples of the vertical electric field mode include the VA mode and the TN mode.

The liquid crystal display panel may be in any liquid crystal mode, such as a mode of providing black display by aligning the liquid crystal molecules in a liquid crystal layer vertically to a substrate surface, or a mode of providing black display by aligning the liquid crystal molecules in the liquid crystal layer parallelly to or in a direction that is not vertical or parallel to a substrate surface. The liquid crystal display panel may be driven by the TFT method (active matrix method), the simple matrix method (passive matrix method), or the plasma address method.

Examples of the self-luminous display panel include organic electroluminescence (EL)-type display panels and Micro-LED-type display panels utilizing micrometer (μm) size fine LEDs as RGB elements.

The backlight 3 may be any backlight that emits light. The backlight 3 has, for example, a configuration including a light source and a reflection sheet. The light source can be a common backlight light source, i.e., a light source such as a cold cathode fluorescent lamp (CCFL) or a light emitting diode (LED).

The backlight 3 may also be a direct-lit one or an edge-lit one. Examples of the edge-lit backlight include a backlight 3 having a light source, a reflection sheet, and a light guide plate. The light source is disposed at an end surface of the light guide plate, and the reflection sheet is disposed on the back surface of the light guide plate. The light guide plate may be one usually used in the field of video display devices. Examples of the reflection sheet include aluminum plates, white polyethylene terephthalate (PET) films, and reflection films (e.g., enhanced specular reflector (ESR) film available from 3M Company).

The display device 1000 of the present embodiment may include, in addition to the members described above, members such as external circuits, including a tape carrier package (TCP) and a printed circuit board (PCB); optical films, including a viewing angle-increasing film and a luminance-increasing film; and a bezel (frame). Some members may be included in another member. Members other than the members already described above are not limited and may each be one usually used in the field of display devices. Thus, description thereof is omitted.

The polarizing glasses 4 are designed to transmit polarized light from the active retarder 1 for images intended for the right eye through the right eye part and transmit polarized light from the active retarder 1 for images intended for the left eye through the left eye part, so that the viewer can see a 3D image.

The polarizing glasses 4 are linearly polarizing glasses with the polarization axis of the left eye part and the polarization axis of the right eye part being perpendicular to each other in a mode where the active retarder 1 has polarization axes to polarize light for images intended for the left eye and light for images intended for the right eye in directions perpendicular to each other. The polarizing glasses 4 are circularly polarizing glasses with the left eye part and the right eye part transmit opposite-handed circularly polarized lights in a mode where the active retarder 1 transmits opposite-handed circularly polarized lights for images intended for the left eye and images intended for the right eye.

Modified Example 1

Embodiment 1 is directed to a case where the liquid crystal panel 10 has a structure in which the pixel electrodes 111 and 112 are disposed on one of the pair of substrates (second substrate 122), the common electrodes 131 and 132 are disposed on the other of the pair of substrates (first substrate 121), and the liquid crystal layer is sandwiched between these electrodes (see FIG. 3). Yet, the structure may be one in which the pixel electrodes and the common electrodes are disposed on one of the substrates and the liquid crystal layer is sandwiched between the one substrate and the other substrate. In other words, a liquid crystal panel 10 of the present modified example includes pixel electrodes 111 and 112 and common electrodes 131 and 132 on the first substrate 121 or the second substrate 122. In this structure, display is provided by applying voltage between the pixel electrodes and the common electrodes disposed on the one substrate to generate a transverse electric field (including a fringe electric field) in the liquid crystal layer. Examples of the transverse electric field mode include the FFS mode and the IPS mode.

Modified Example 2

Embodiment 1 is directed to a structure where the active retarder 1 includes the liquid crystal panel 10 and the phase difference plate 20. However, the structure may be one in which at least one of the substrates 121 and 122 in the liquid crystal panel 10 serves also as a phase difference plate. In other words, an active retarder 1 of the present modified example consists of a liquid crystal panel 10. Suitably, the substrate 121 or 122, whichever is on the image display panel 2 side, serves as the phase difference plate.

Embodiment 2

In the present embodiment, features unique to the present embodiment are mainly described, and the same contents as in Embodiment 1 are omitted. The present embodiment is substantially the same as Embodiment 1, except that the shape of each aperture between common electrodes is different.

Figure 14:
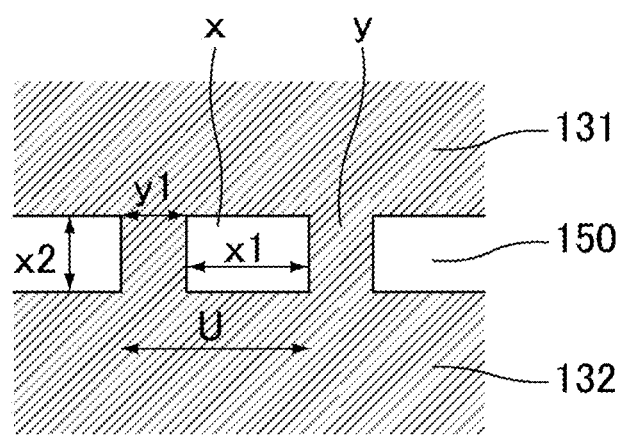
FIG. 14 is an enlarged view of the p portion in FIG. 1 in Embodiment 2.
Figure 15:
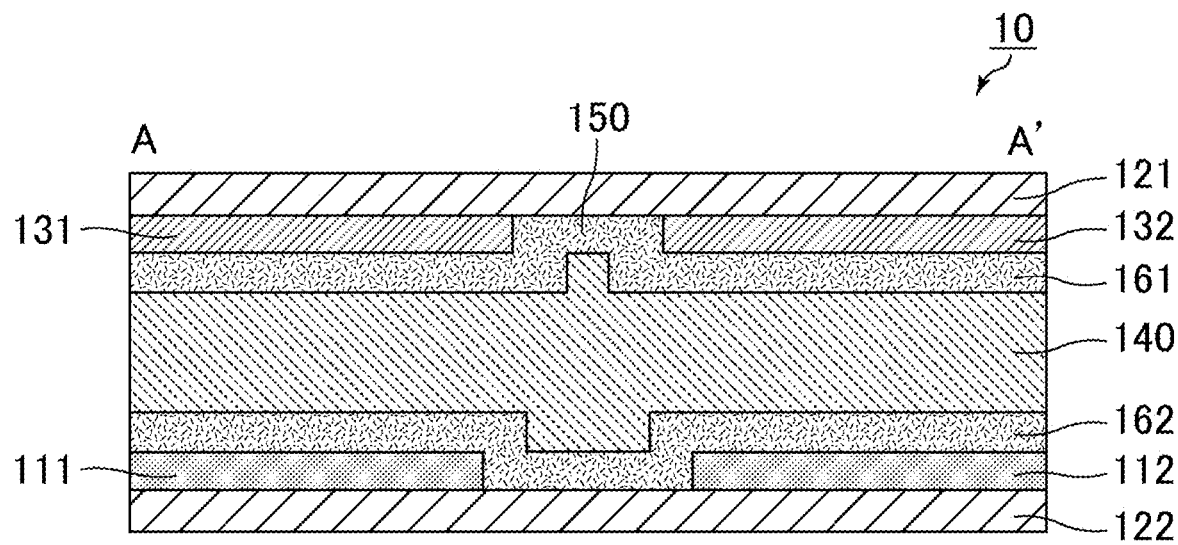
FIG. 15 is a schematic cross-sectional view taken along the A-A' line in FIG. 1 (A-A' line cross-sectional view) in Embodiment 2.
Figure 16:
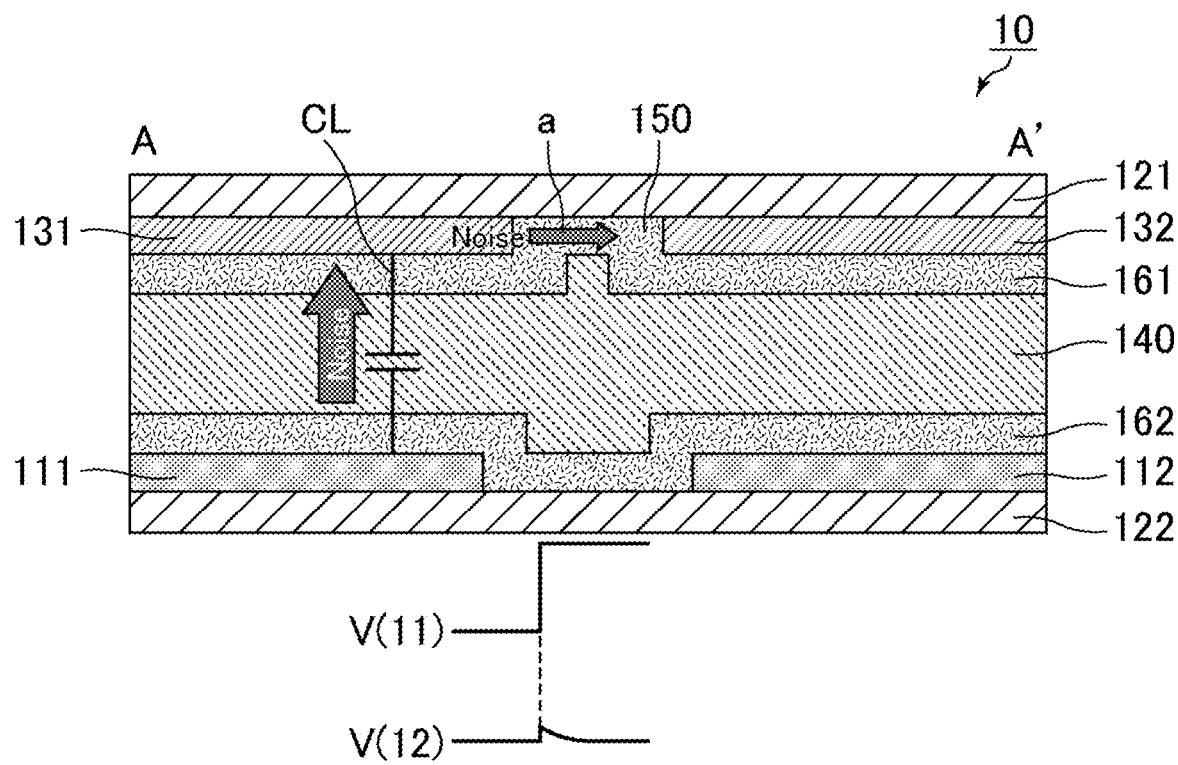
FIG. 16 is a conceptual view showing noise propagation and waveforms of liquid crystal application voltages in Embodiment 2.

FIG. 1 is also a schematic plan view of the liquid crystal panel of the present embodiment as seen from the viewing surface side. FIG. 14 is an enlarged view of the p portion in FIG. 1. FIG. 15 is a schematic cross-sectional view taken along the A-A' line in FIG. 1 (A-A' line cross-sectional view). FIG. 16 is a conceptual view showing noise propagation and waveforms of liquid crystal application voltages in FIG. 15. FIG. 16 shows simplified waveforms of the voltages. In each of FIG. 15 and FIG. 16, the top of the figure corresponds to the viewing surface side and the bottom of the figure corresponds to the back surface side.

In Embodiment 1, in a plan view, the aperture 150 has a continuous linear shape extending along the entire range between the first common electrodes 131 and the second common electrodes 132 at least in the display region AA (see FIG. 2). Meanwhile, in the present embodiment, in a plan view, the aperture 150 has a non-continuous linear shape extending along the entire range between the first common electrodes 131 and the second common electrodes 132 at least in the display region AA (see FIG. 14). Specifically, as shown in FIG. 14, the aperture 150 in a plan view has a shape with connection portions y between the first common electrodes 131 and the second common electrodes 132 alternating with common electrode-absent portions x (meaning portions with no common electrode, corresponding to apertures in a narrow sense), i.e., a shape including a repeating unit U consisting of the portions x and y. Such an aperture 150 can be formed by, for example, removing the portions of the planar common electrode overlapping the boundary between pixel electrodes that overlap the planar common electrode.

The size of the aperture 150 is preferably such that, for example, the width between the first common electrode 131 and the second common electrode 132 across the aperture 150 (x2 in FIG. 14) is from 0.1 to 1000 µm, more preferably from 10 to 100 µm. When the aperture 150 has a shape with the repeating unit U shown in FIG. 14, the repeating pitch (U in FIG. 14) is preferably from 0.1 to 1000 µm, more preferably from 10 to 100 µm. In the repeating pitch U, the ratio (y1/x1) of a pitch y1 of the connection portion y between the first common electrode 131 and the second common electrode 132 to a pitch x1 of the common electrode-absent portion x is preferably from 1/1 to 1/30, more preferably from 1/5 to 1/15.

When the aperture 150 in the present embodiment is formed, first, the size of the connection portion y between the first common electrode 131 and the second common electrode 132 (x2 and y1 in FIG. 14) is set to the minimum size possible in the manufacturing process or a value close thereto, and then the pitch (x1 in FIG. 14) of the common electrode-absent portion x is adjusted, so that the resistance can be controlled to the desired value. The size and shape of the common electrode-absent portion x are presumably different when the signal voltage and the liquid crystal material of the liquid crystal layer 140 are different.

In Embodiment 1, since the common electrode is not present in the pixel boundary as described above, the noise propagation path is almost completely lost in the display region, so that the effect of reducing noise to the adjacent pixel is significantly high. On the contrary, there is no escape for noise on the first common electrode 131. In other words, noise on the first common electrode 131 cannot escape to the second common electrode 132, so that it seemingly takes longer for the first common electrode 131 to go back to the appropriate electric potential from the state disturbed by noise than in the liquid crystal panel 10R of the comparative embodiment with no aperture 150. Since the liquid crystal application voltage is usually the difference between the pixel electric potential and the common electric potential, the longer it takes for the first common electrode 131 to go back to the appropriate electric potential, the longer it will take for the liquid crystal application voltage to reach the desired value.

In contrast, in the present embodiment, the above mechanism enables a state where the first common electrode 131 and the second common electrode 132 are electrically connected to each other through a high-resistance path. In other words, since the first common electrode 131 and the second common electrode 132 are partially connected to each other (see the y portion in FIG. 14), noise on the first common electrode 131 propagates to the second common electrode 132 while being attenuated by the resistance (see the a portion in FIG. 16). This means that the electric potential of the first common electrode 131 disturbed by noise more rapidly returns to the appropriate electric potential than in Embodiment 1. In other words, in the present embodiment, pixel charging can be more rapid than in Embodiment 1. In the present embodiment, noise propagating to the second common electrode 132 can be attenuated to a level that does not adversely affect the display quality.

Embodiment 3

In the present embodiment, features unique to the present embodiment are mainly described, and the same contents as in Embodiment 1 are omitted. The present embodiment is substantially the same as Embodiment 1, except that the liquid crystal panel further includes a light-blocking component.

Figure 17:
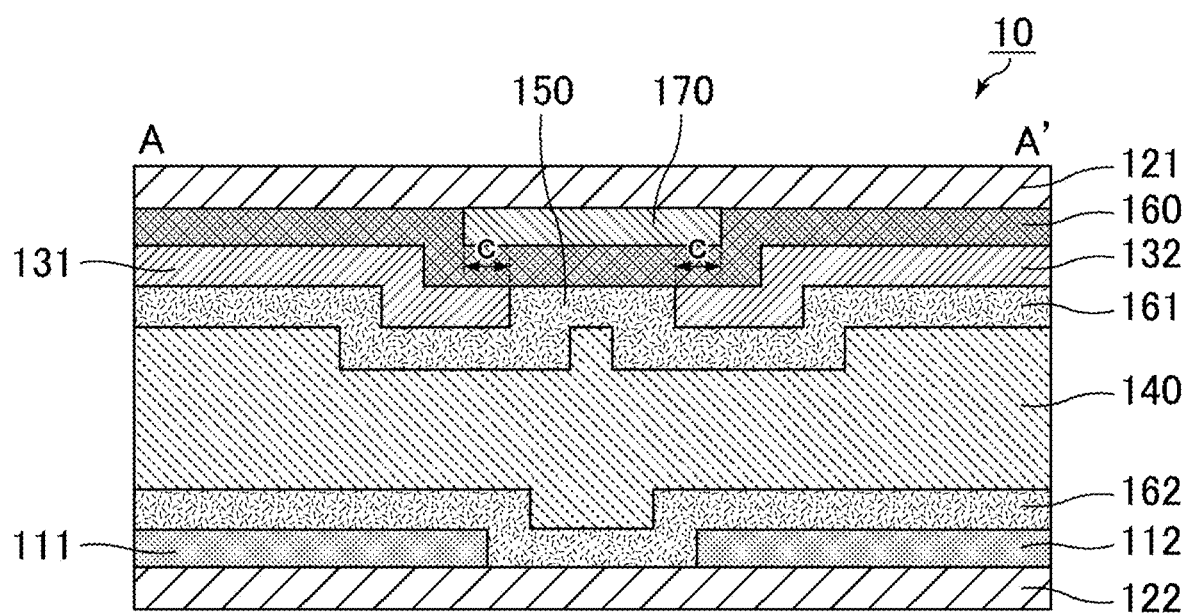
FIG. 17 is a schematic cross-sectional view taken along the A-A' line in FIG. 1 (A-A' line cross-sectional view) in Embodiment 3.

FIG. 1 is also a schematic plan view of the liquid crystal panel of the present embodiment as seen from the viewing surface side. FIG. 17 is a schematic cross-sectional view taken along the A-A' line in FIG. 1 (A-A' line cross-sectional view). In FIG. 17, the top of the figure corresponds to the viewing surface side and the bottom of the figure corresponds to the back surface side.

The liquid crystal panel 10 of the present embodiment includes pixels adjacent to each other. As described above, the drawings are based on a mode in which each pixel unit has a first pixel 11 and a second pixel 12. The liquid crystal panel 10 includes, between a pair of substrates 121 and 122, a first pixel electrode 111 corresponding to the first pixel 11, a second pixel electrode 112 corresponding to the second pixel 12, a first common electrode 131 overlapping the first pixel electrode 111, a second common electrode 132 overlapping the second pixel electrode 112, a liquid crystal layer 140, and a light-blocking component 170. An insulating layer 160 is disposed between the light-blocking component 170 and the common electrodes 131 and 132. Alignment films 161 and 162 are respectively disposed between the liquid crystal layer 140 and the common electrodes 131 and 132 and between the liquid crystal layer 140 and the pixel electrodes 111 and 112.

While the aperture 150 overlaps the boundary between the pixel electrodes 111 and 112 that respectively overlap the common electrodes 131 and 132 in the present embodiment, the light-blocking component 170 in a plan view overlaps the first common electrode 131, the aperture 150, and the second common electrode 132 (see FIG. 17). In other words, the light-blocking component 170 in a plan view is disposed across the first common electrode 131, the aperture 150, and the second common electrode 132. The entire aperture 150 overlaps the light-blocking component 170. In other words, the aperture 150 is covered with the light-blocking component 170. The common electrodes 131 and 132 each partially overlap the light-blocking component 170 (see the c portion in FIG. 17). The width c of the overlap between the light-blocking component 170 and each of the common electrodes 131 and 132 is suitably from 1 to 5 µm, for example.

The liquid crystal panel 10 includes an input unit X that inputs the same signal to the first common electrode 131, the second common electrode 132, and the light-blocking component 170. This input unit X connects the first common electrode 131, the second common electrode 132, and the light-blocking component 170 to one another inside or outside the liquid crystal panel 10. In other words, the liquid crystal panel 10 has a structure in which the first common electrode 131, the second common electrode 132, and the light-blocking component 170 are connected to one another inside or outside the liquid crystal panel 10. This puts the first common electrode 131, the second common electrode 132, and the light-blocking component 170 all at the same electric potential. In other words, a common electric potential is input to the light-blocking component 170. In particular, the first common electrode 131, the second common electrode 132, and the light-blocking component 170 are preferably connected to one another outside the display region of the liquid crystal panel 10.

Figure 18:
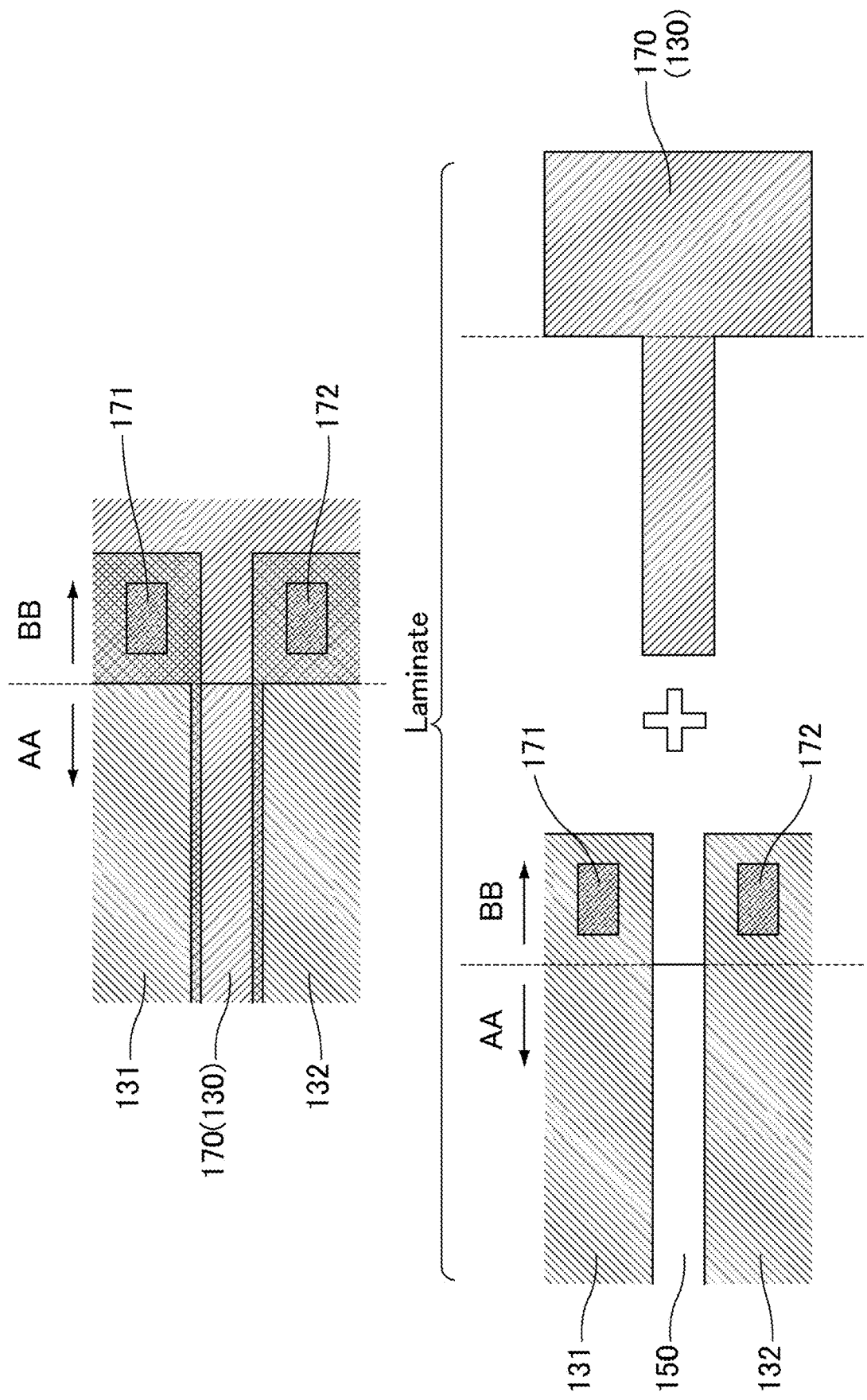
FIG. 18 is an enlarged schematic plan view of the X1 portion in FIG. 1 in Embodiment 3 and is also a conceptual view of how the embodiment is achieved.

In the present embodiment, the common electrode 130 is formed using a light-blocking component 170, the common electrode 130 (light-blocking component 170) is disposed to overlap the aperture 150, the first common electrode 131, and the second common electrode 132, and the common electrode 130 is connected to each of the first common electrode 131 and the second common electrode 132 via the respective contact holes. Specifically, as shown in the lower part of the FIG. 18, a T-shaped light blocker (which constitutes the light-blocking component 170) is prepared, and the light blocker is disposed to overlap part of the first common electrode 131 in the display region AA, the contact hole 171 in the first common electrode 131, the aperture 150 in the display region AA, part of the second common electrode 132 in the display region AA, and the contact hole 172 in the second common electrode 132. FIG. 18 is an enlarged schematic plan view of the X1 portion in FIG. 1 to show an embodiment including the light-blocking component 170 and is also a conceptual view of how the embodiment is achieved.

With the light-blocking component 170, the liquid crystal panel 10 further reduces the noise propagation between the first common electrode 131 and the second common electrode 132. This is presumably because the lines of electric force from the common electrodes 131 and 132 are absorbed by the light-blocking component 170 and the interlayer capacitance between the common electrodes and the pixel electrodes are reduced. Also, with the light-blocking component 170, the liquid crystal panel 10 can sufficiently reduce the influence of the aperture 150 on other layers. For example, with the aperture 150, the region with uncontrollable alignment of the liquid crystal molecules in the liquid crystal layer 140 possibly expands, but the light-blocking component 170 capable of shielding such a region from light sufficiently reduces the influence on the alignment of the liquid crystal molecules.

Examples of the light-blocking material constituting the light-blocking component 170 (light blocker) include metals and resin materials. Non-limiting examples of the metals include aluminum, molybdenum, chromium, titanium, and alloys of any of these metals. Examples of the resin materials include materials commonly used as black resists. The shape of the light-blocking component 170 may be, for example, a linear shape or a film shape.

The light transmittance of the light-blocking component 170 is, for example, preferably from 0 to 1%. The light transmittance can be measured by a method in conformity with JIS K7375 (2008).

The thickness of the light-blocking component 170 is preferably, for example, 10 nm or greater and 2 μm or smaller, more preferably 50 nm or greater and 1.0 μm or smaller.

An insulating layer (also referred to as an insulating film) 160 is disposed between the light-blocking component 170 and the common electrodes 131 and 132. The insulating layer 160 is formed using an inorganic insulating film or an organic insulating film. An inorganic insulating film may be, for example, a silicon nitride (SiNx) film, a silicon oxide (SiO$_2$) film, or another inorganic film (relative dielectric constant ε=5 to 7), or a laminate of such films. An organic insulating film may be, for example, a photosensitive resin or another organic film with a low relative dielectric constant (relative dielectric constant ε=2 to 5) or a laminate of such films. Specific examples thereof include organic films such as acrylic resin films, polyimide resin films, and novolac resin films, and laminates of such films.

The thickness of the insulating layer 160 is preferably, for example, 10 nm or greater and 1 μm or smaller, more preferably 30 nm or greater and 500 nm or smaller.

Embodiment 4

In the present embodiment, features unique to the present embodiment are mainly described, and the same contents as in Embodiment 1 are omitted. The present embodiment is substantially the same as Embodiment 1, except that the liquid crystal panel of the present embodiment further includes auxiliary electrodes.

Figure 19:
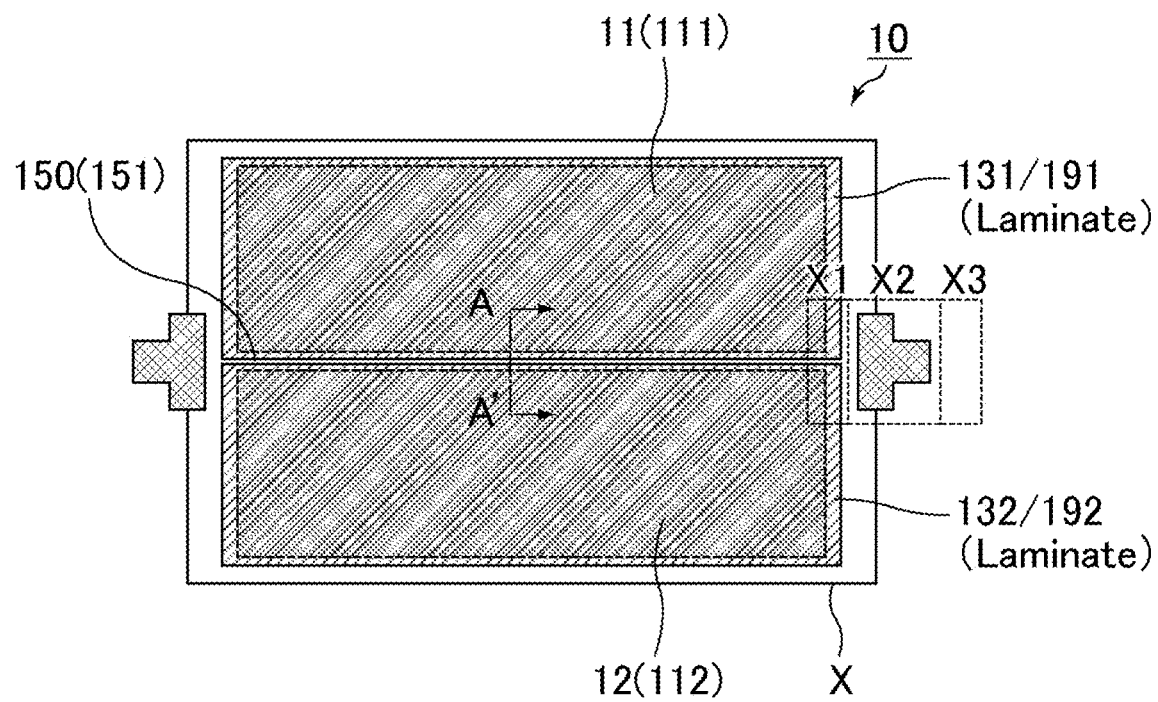
FIG. 19 is a schematic plan view of a liquid crystal panel of Embodiment 4 as seen from the viewing surface side.
Figure 20:
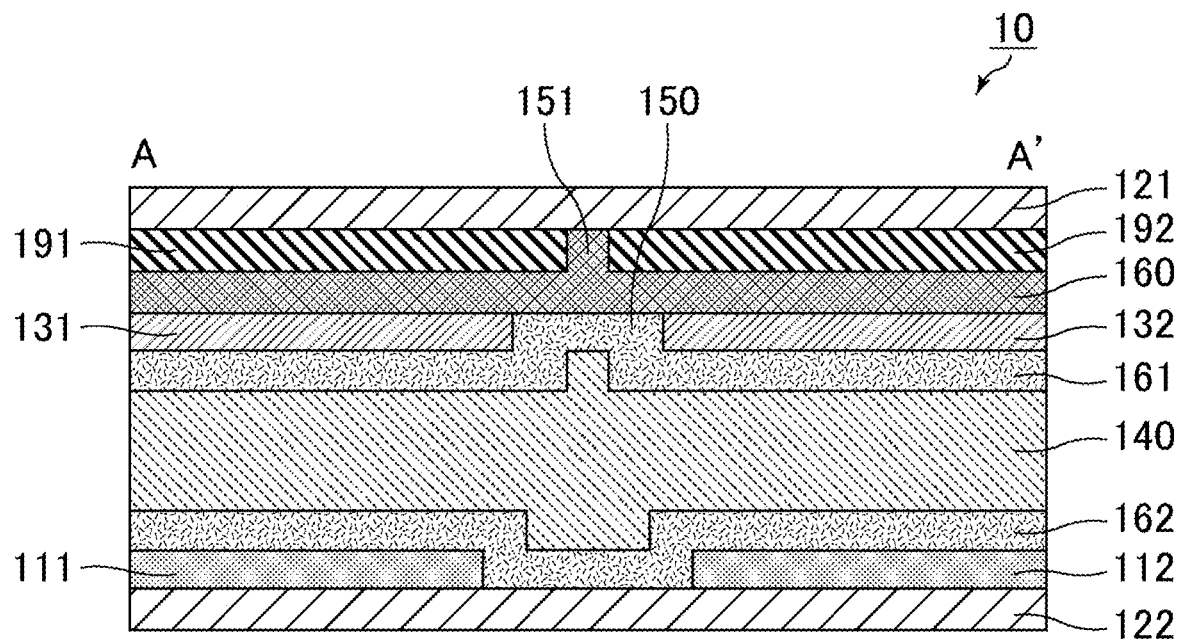
FIG. 20 is a schematic cross-sectional view taken along the A-A' line in FIG. 19 (A-A' line cross-sectional view).
Figure 21:
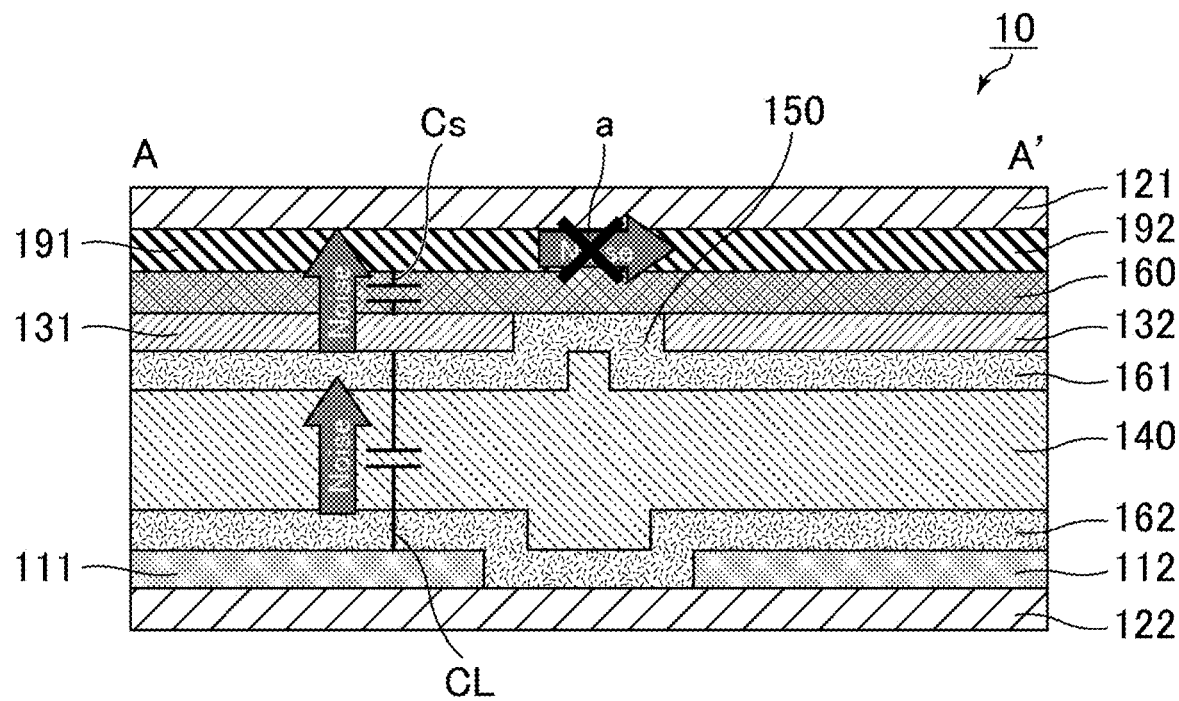
FIG. 21 shows noise propagation in Embodiment 4.
Figure 22:
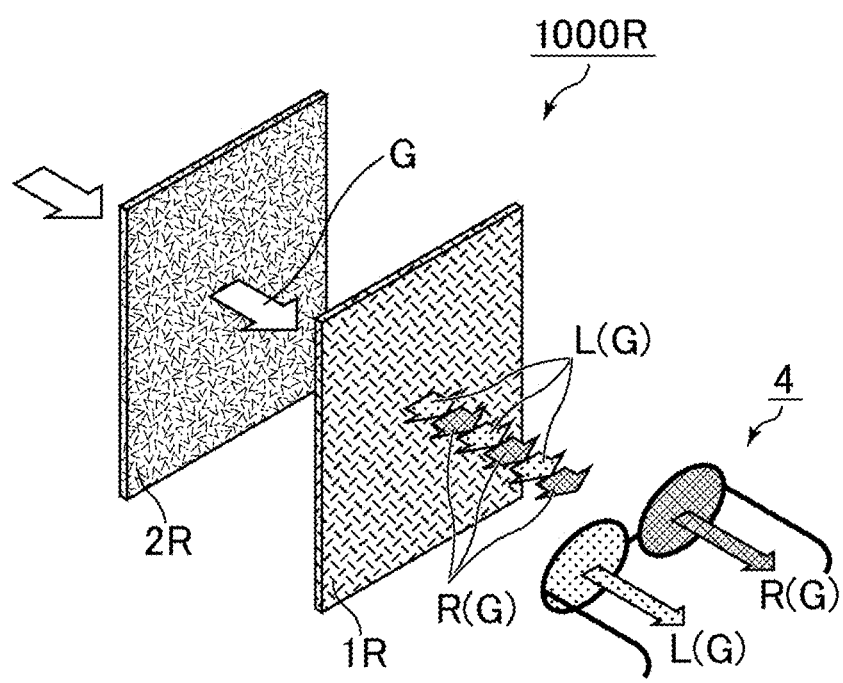
FIG. 22 is a schematic view of the mechanism in which a conventional active retarder-type display device for 3D images enables observation of images.
Figure 23:
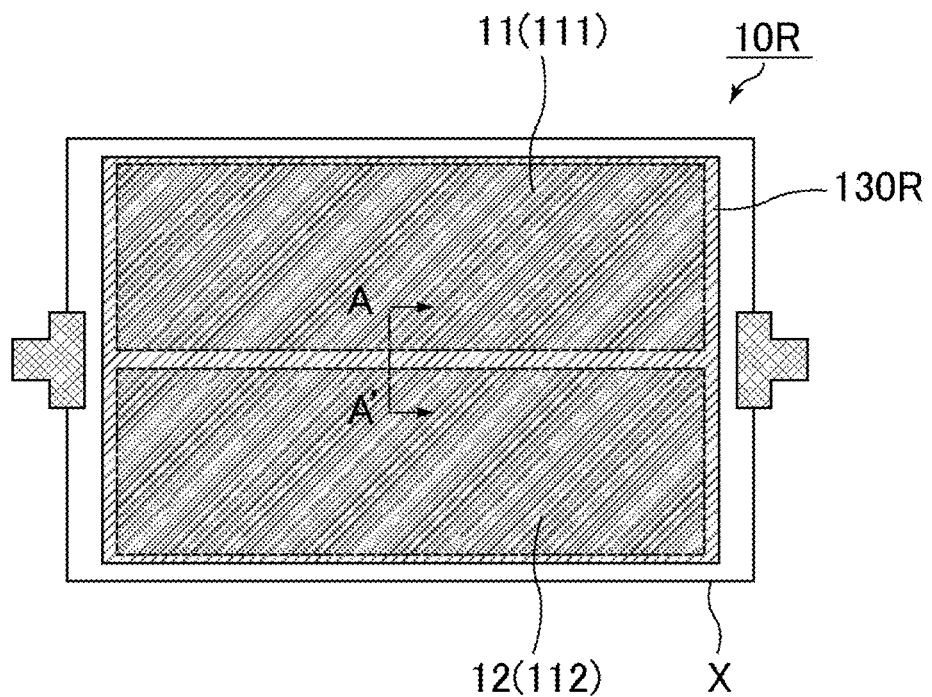
FIG. 23 is a schematic plan view of a liquid crystal panel of a comparative embodiment as seen from the viewing surface side.

FIG. 19 is a schematic plan view of the liquid crystal panel of the present embodiment as seen from the viewing surface side. FIG. 20 is a schematic cross-sectional view taken along the A-A' line in FIG. 19 (A-A' line cross-sectional view). FIG. 21 shows noise propagation in FIG. 20. In each of FIG. 20 and FIG. 21, the top of the figure corresponds to the viewing surface side and the bottom of the figure corresponds to the back surface side.

The liquid crystal panel 10 of the present embodiment includes pixels adjacent to each other. As described above, the drawings are based on a mode in which each pixel unit is divided into a first pixel 11 and a second pixel 12. The liquid crystal panel 10 includes, between a pair of substrates 121 and 122, a first pixel electrode 111 corresponding to the first pixel 11, a second pixel electrode 112 corresponding to the second pixel 12, a first common electrode 131 overlapping the first pixel electrode 111, a second common electrode 132 overlapping the second pixel electrode 112, and a liquid crystal layer 140. The liquid crystal panel 10 further includes a first auxiliary electrode 191 and a second auxiliary electrode 192 between the pair of substrates 121 and 122. Alignment films 161 and 162 are respectively disposed between the liquid crystal layer 140 and the common electrodes 131 and 132 and between the liquid crystal layer 140 and the pixel electrodes 111 and 112.

The auxiliary electrodes 191 and 192 are respectively disposed opposite to the liquid crystal layer 140 across the common electrodes 131 and 132. In other words, the first auxiliary electrode 191 is disposed between the first substrate 121 and the first common electrode 131, and the second auxiliary electrode 192 is disposed between the first substrate 121 and the second common electrode 132. An insulating layer 160 is disposed between the first auxiliary electrode 191 and the first common electrode 131 and between the second auxiliary electrode 192 and the second common electrode 132. In other words, the auxiliary electrodes 191 and 192 are respectively opposite to the common electrodes 131 and 132 across the insulating layer 160.

Also in the present embodiment, the first common electrode 131 and the second common electrode 132 are adjacent to each other across the aperture 150 in a plan view. The aperture 150 is also referred to as a first aperture, for convenience. In the present embodiment, the first auxiliary electrode 191 and the second auxiliary electrode 192 are adjacent to each other across an aperture 151 in a plan view (see FIG. 19). The aperture 151 is also referred to as a second aperture, for convenience. The first aperture 150 and the second aperture 151 overlap each other (see FIG. 19 and FIG. 20).

In the present embodiment, a structure can be obtained in which while the auxiliary electrodes 191 and 192 are adjacent to each other across the second aperture 151, the auxiliary electrodes 191 and 192 are not connected (not electrically continuous) to each other in the second aperture 151 (see FIG. 20). The second aperture 151 overlaps the boundary between the pixel electrodes 111 and 112 that respectively overlap the auxiliary electrodes 191 and 192 (see FIG. 20).

In the present embodiment, for example, the portion of a planar auxiliary electrode (solid auxiliary electrode) overlapping the boundary between the pixel electrodes that overlap the auxiliary electrode is removed. Thereby, the structure in which the auxiliary electrodes 191 and 192 are adjacent to each other across the second aperture 151 can be obtained. In particular, when all such portions of the auxiliary electrode in the display region AA are removed, in a plan view, a structure is obtainable in which the second aperture 151 extends like a continuous line extending along the entire range between the first auxiliary electrodes 191 and the second auxiliary electrodes 192 at least in the display region AA (see FIG. 19).

In the present embodiment, capacitance CL is generated between the common electrode 131 and the pixel electrode 111 and between the common electrode 132 and the pixel electrode 112. Capacitance Cs is generated between the auxiliary electrode 191 and the common electrode 131 and between the auxiliary electrode 192 and the common electrode 132 (see FIG. 21). Thus, with the auxiliary electrodes, the auxiliary electrodes and the common electrodes are connected via a huger amount of capacitance. Here, for example, noise transmitted to the first common electrode 131 when the first pixel 11 is charged through signal input is also transmitted to the first auxiliary electrode 191 overlapping the first common electrode 131. Also, the varying electric potential of each auxiliary electrode affects the common electric potential, i.e., the liquid crystal application electric potential. However, in the present embodiment, the second aperture 151 between the auxiliary electrodes 191 and 192 can reduce propagation of noise on the first auxiliary electrode 191 to the adjacent pixel (see the a portion in FIG. 21). In this manner, the structure with auxiliary electrodes can also sufficiently reduce noise when the concept of the present invention is applied thereto.

The size of the second aperture 151 in a plan view may be any size with which the second aperture 151 overlaps the boundary between the pixel electrodes, i.e., the pixel electrode-absent portion (meaning a portion without the pixel electrode). For example, the width of the second aperture 151 is preferably from 0.1 to 1000 µm, more preferably from 10 to 100 µm. Also, a design is preferred in which the width of the second aperture 151 is smaller than the width of the first aperture 150 in a plan view (see FIG. 20). The "width of the second aperture" means the width in a plan view between the first auxiliary electrode 191 and the second auxiliary electrode 192 between which the second aperture 151 is sandwiched.

The auxiliary electrodes 191 and 192 are formed from a transparent conductive material such as ITO or IZO. For example, the auxiliary electrodes 191 and 192 can be formed by patterning a transparent electrode film formed from a transparent conductive material by a known photolithography method. In the present embodiment, for example, a planar (solid) auxiliary electrode is formed and patterned as described above, and then the portion of the planar auxiliary electrode overlapping the boundary between the pixel electrodes that overlap the planar auxiliary electrode is removed. Thus, the planar auxiliary electrode can be divided into the auxiliary electrodes 191 and 192.

The insulating layer 160 can be formed using an inorganic insulating film or an organic insulating film. The thickness of the insulating layer 160 is not limited, and is preferably, for example, 10 nm or greater and 1 µm or smaller, more preferably 30 nm or greater and 500 nm or smaller.

Embodiments of the present invention have been described. Each and every matter described above is applicable to the general aspects of the present invention.

EXAMPLES

The present invention is described in more detail below with reference to examples and comparative examples. The present invention is not limited to the examples.

Example 1

A liquid crystal panel of Example 1 corresponds to the liquid crystal panel of Embodiment 1 (see FIG. 1 to FIG. 9). Glass plates are used as the substrates 121 and 122, and x2 in FIG. 2 is 20 µm. The liquid crystal panel of the present example has a very high effect of reducing noise propagation to the adjacent pixel, and can reduce noise without an increase in load on the system.

Example 2

A liquid crystal panel of Example 2 corresponds to the liquid crystal panel of Embodiment 2 (see FIG. 1, FIG. 5 to FIG. 9, and FIG. 14 to FIG. 16). Glass plates are used as the substrates 121 and 122, and in FIG. 14, x2 is 20 µm, x1 is 45 µm, y1 is 5 µm, and the length of U (i.e., sum of x1 and y1) is 50 µm. Although the liquid crystal panel of Example 1 has a significantly higher effect of reducing noise propagation than the liquid crystal panel of the present example, the liquid crystal panel of the present example can attenuate noise to a level that does not adversely affect the display quality. The liquid crystal panel of the present example can accelerate pixel charging as compared with the liquid crystal panel of Example 1.

Example 3

A liquid crystal panel of Example 3 corresponds to the liquid crystal panel of Embodiment 3 (see FIG. 1, FIG. 2, FIG. 5 to FIG. 9, FIG. 17, and FIG. 18). Glass plates are used as the substrates 121 and 122, and metal lines are used as the light-blocking component 170. The liquid crystal panel of the present example has a higher effect of reducing noise propagation than the liquid crystal panel of Example 1, and the influence of formation of an aperture 150 on the alignment of liquid crystal molecules can be sufficiently reduced.

Example 4

A liquid crystal panel of Example 4 corresponds to the liquid crystal panel of Embodiment 4 (see FIG. 1, FIG. 2, FIG. 5 to FIG. 9, and FIG. 19 to FIG. 21). Glass plates are used as the substrates 121 and 122.

The liquid crystal panel of the present example can reduce noise propagation from an auxiliary electrode to the adjacent pixel. In other words, the structure with auxiliary electrodes can also sufficiently reduce noise when the concept of the present invention is applied thereto.

The embodiments of the present invention described above may be combined as appropriate within the gist of the present invention.

REFERENCE SIGNS LIST 1, 1R: active retarder
2, 2R: image display panel
3: backlight
4: polarizing glasses
10, 10R: liquid crystal panel
20: phase difference plate
11, 12: pixel (subpixel)
111, 112: pixel electrode
121, 122: substrate
130, 131, 132, 130R: common electrode
140: liquid crystal layer
150, 151: aperture
160: insulating layer
161, 162: alignment film
170: light-blocking component
171, 172: contact hole
180: flexible printed circuit
181: drive circuit
182: conductive line
191, 192: auxiliary electrode
1000, 1000R: display device
q: end of liquid crystal panel
x: common electrode-absent portion
y: connection portion between common electrodes
AA: display region of liquid crystal panel or display device
BB: frame region of liquid crystal panel or display device
G: image
L(G): image intended for left eye
R(G): image intended for right eye
U: repeating unit consisting of x and y
X: signal input unit

What is claimed is:

1. A liquid crystal panel comprising:
pixels adjacent to one another;
a pair of substrates;
pixel electrodes corresponding to the pixels, respectively;
common electrodes overlapping the pixel electrodes, respectively;
a liquid crystal layer; and
an input unit, wherein
the pixel electrodes, the common electrodes, and the liquid crystal layer are disposed between the pair of substrates,
the common electrodes are adjacent to one another across an aperture in a plan view,
the aperture overlaps a boundary between the pixel electrodes,
the input unit is configured to input a same signal for the common electrodes,
the pixel electrodes comprise a first pixel electrode and a second pixel electrode that are adjacent to each other across the boundary,
the common electrodes comprise a first common electrode and a second common electrode that are adjacent to each other across the aperture,
in a display region where the pixel electrodes are disposed, the first common electrode is disposed to cover the first pixel electrode and the second common electrode is disposed to cover the second pixel electrode,
the aperture and the boundary between the first pixel electrode and the second pixel electrode overlap each other across the liquid crystal layer,
a width of the first common electrode is constant, when viewed in the plan view, in the display region, and
the first common electrode is continuously connected in an extension direction of the aperture across an entirety of the display region in the plan view.

2. The liquid crystal panel according to claim 1, further comprising a light-blocking component between the pair of substrates,
wherein the light-blocking component overlaps the common electrodes and the aperture in the plan view, and
the input unit is configured to input the same signal for the common electrodes and the light-blocking component.

3. The liquid crystal panel according to claim 1, further comprising auxiliary electrodes between the pair of substrates,
wherein the auxiliary electrodes are adjacent to each other across a second aperture in the plan view, and
the second aperture overlaps a boundary between the pixel electrodes.

4. The liquid crystal panel according to claim 1,
wherein one of the pair of substrates includes the pixel electrodes and another one of the pair of substrates includes the common electrodes.

5. An active retarder for a three dimensional (3D) image display, comprising:
the liquid crystal panel according to claim 1.

6. A display device comprising:
an image display panel; and
the active retarder for the 3D image display according to claim 5,
wherein the image display panel is configured to sequentially display an image intended for a right eye and an image intended for a left eye by time-based switching.

7. A display device comprising:
the liquid crystal panel according to claim 1.

8. A liquid crystal panel comprising:
pixels adjacent to one another;
a pair of substrates;
pixel electrodes corresponding to the pixels, respectively;
common electrodes overlapping the pixel electrodes, respectively;
a liquid crystal layer; and
an input unit, wherein
the pixel electrodes, the common electrodes, and the liquid crystal layer are disposed between the pair of substrates,
the common electrodes are adjacent to one another across an aperture in a plan view,
the aperture overlaps a boundary between the pixel electrodes,
the input unit is configured to input a same signal for the common electrodes,
the pixel electrodes comprise a first pixel electrode and a second pixel electrode that are adjacent to each other across the boundary,
the common electrodes comprise a first common electrode and a second common electrode that are adjacent to each other across the aperture,
in a display region where the pixel electrodes are disposed, the first common electrode is disposed to cover the first pixel electrode and the second common electrode is disposed to cover the second pixel electrode, the aperture and the boundary between the first pixel electrode and the second pixel electrode overlap each other across the liquid crystal layer, a width of the first common electrode is constant, when viewed in the plan view, in the display region, the liquid crystal panel further comprises a planar common electrode that overlaps both the display region and a region outside the display region, the planar common electrode is divided into the common electrodes within the display region, and the planar common electrode is undivided in the region outside the display region.

9. The liquid crystal panel according to claim 8, further comprising a light-blocking component between the pair of substrates, wherein the light-blocking component overlaps the common electrodes and the aperture in the plan view, and the input unit is configured to input the same signal for the common electrodes and the light-blocking component.

10. The liquid crystal panel according to claim 8, further comprising auxiliary electrodes between the pair of substrates, wherein the auxiliary electrodes are adjacent to each other across a second aperture in the plan view, and the second aperture overlaps a boundary between the pixel electrodes.

11. The liquid crystal panel according to claim 8, wherein one of the pair of substrates includes the pixel electrodes and another one of the pair of substrates includes the common electrodes.

12. An active retarder for a three dimensional (3D) image display, comprising:

the liquid crystal panel according to claim 8.

13. A display device comprising:

an image display panel; and the active retarder for the 3D image display according to claim 12, wherein the image display panel is configured to sequentially display an image intended for a right eye and an image intended for a left eye by time-based switching.

14. A display device comprising:

the liquid crystal panel according to claim 8.

* * * * *